United States Patent [19]
Ikushima et al.

[11] Patent Number: 6,015,848
[45] Date of Patent: Jan. 18, 2000

[54] COATING COMPOSITION AND METHOD FOR APPLICATION THEREOF

[75] Inventors: Satoshi Ikushima, Kashihara; Seiji Wada, Hiratsuka; Yasumasa Okumura, Yokohama; Haruhiko Aida, Hiratsuka; Motoshi Yabuta, Hadano; Yoshiyuki Yukawa; Ken-ichi Hasada, both of Hiratsuka, all of Japan

[73] Assignee: Kansai Paint Co., Ltd., Hyogo-ken, Japan

[21] Appl. No.: 08/985,907

[22] Filed: Dec. 5, 1997

[30] Foreign Application Priority Data

| Dec. 5, 1996 | [JP] | Japan | 8-339091 |
| Jan. 31, 1997 | [JP] | Japan | 9-019022 |
| Jan. 31, 1997 | [JP] | Japan | 9-019023 |
| Jan. 31, 1997 | [JP] | Japan | 9-031497 |
| Mar. 7, 1997 | [JP] | Japan | 9-068962 |
| Mar. 26, 1997 | [JP] | Japan | 9-089944 |
| Jun. 26, 1997 | [JP] | Japan | 9-184623 |
| Aug. 11, 1997 | [JP] | Japan | 9-228868 |
| Aug. 15, 1997 | [JP] | Japan | 9-233284 |

[51] Int. Cl.$^7$ .......... C08L 63/00; C08L 83/04; C08J 3/28
[52] U.S. Cl. .......... 523/427; 523/433; 523/435; 523/436; 522/15; 524/493; 524/858; 525/107; 525/407; 525/524; 525/922; 528/103; 528/103.5
[58] Field of Search .......... 524/94, 493, 858; 522/15; 523/427, 433, 435, 436; 525/107, 524, 407, 922; 528/103, 103.5

[56] References Cited

U.S. PATENT DOCUMENTS

| 4,098,841 | 7/1978 | Nagata et al. | 525/922 |
| 4,127,157 | 11/1978 | Gardikes et al. | 164/12 |
| 4,379,885 | 4/1983 | Miller et al. | 523/435 |
| 4,703,338 | 10/1987 | Sagami et al. | 525/922 |
| 4,816,496 | 3/1989 | Wada et al. | 522/17 |
| 5,013,788 | 5/1991 | Nagashima et al. | 524/493 |
| 5,049,623 | 9/1991 | Dupont | 525/293 |
| 5,055,518 | 10/1991 | Dupont et al. | 525/59 |
| 5,235,006 | 8/1993 | Jones et al. | 525/510 |
| 5,326,827 | 7/1994 | Aoki et al. | 525/337 |
| 5,609,960 | 3/1997 | Kasan et al. | 428/413 |

FOREIGN PATENT DOCUMENTS

| 0 361 852 | 4/1990 | European Pat. Off. . |
| 0 533 701 | 8/1993 | European Pat. Off. . |
| 61-031425 | 2/1986 | Japan . |
| 61-060720 | 3/1986 | Japan . |
| 4-170486 | 6/1992 | Japan . |
| 404300980 | 10/1992 | Japan . |

OTHER PUBLICATIONS

Lardner et al., "Effect of the Substrate on Microindentation Behavior", Mat. Res. Soc. Symp. Proc., vol. 308 Apr. 12–16, 1993, pp. 189–194.

Nakano et al., "Thermal Cationic Curing With Benzylammonium Salts", Progr. Org. Coatings, vol. 28, No. 2 (1996), pp. 142–148.

*Primary Examiner*—Tae Yoon
*Attorney, Agent, or Firm*—Wenderoth, Lind & Ponack, L.L.P.

[57] ABSTRACT

The present invention provides a thermosetting organic solvent type coating capable of forming a cured coating film having a TUKON hardness at 20° C. of 15 or more and the minimum value of dynamic modulus E' at a frequency of 110 Hz in the temperature range of 150–200° C., of $1 \times 10^9$ dyn/cm$^2$ or more. The cured film formed from the coating, as compared with the cured films formed from conventional organic solvent type coatings used as a top coat for automobile (e.g. an organic solvent type coating containing, as main components, a hydroxyl group-containing acrylic resin and a melamine resin, or a carboxylic-epoxy type coating), is at least equivalent in weatherability, finish appearance, acid resistance, etc. and superior in stain resistance.

35 Claims, No Drawings

COATING COMPOSITION AND METHOD FOR APPLICATION THEREOF

The present invention relates to a coating composition capable of forming a coating film which is not softened even at high temperatures of 60° C. or higher, which has excellent stain resistance, and which allows easy removal of the staining substances adhering thereto; as well as to a method for applying the coating composition.

As the top coat (clear coat, in particular) for automobile body panel, there are generally used organic solvent type coatings containing, as main components, a hydroxyl group-containing acrylic resin and a melamine resin. The coating film of such a coating is superior in weatherability, finish appearance, etc. but has a problem of insufficiency in acid rain resistance which has become an important item recently. As a top coat improved in acid rain resistance, there was proposed an organic solvent type coating which contains no melamine resin and which contains, as main components, a carboxyl group-containing resin and an epoxy group-containing resin (the coating is generally called a carboxylic-epoxy type coating). The cured film of the carboxylic-epoxy type coating is superior in weatherability and finish appearance and good in acid resistance but has a problem of low stain resistance and difficulty in complete removal of staining substances adhering thereto.

The top coat film of automobile body panel undergoes adhesion, infiltration and sticking of staining substances (e.g. bird droppings, pollen and dead insects), iron dust, sand and dirt and particles in exhaust gas (e.g. carbon and paraffin) and thereby is stained easily. For example, the bird droppings on the film shrink when dried and solidified; consequently, the film surface causes shrinkage as well; the shrunk film portion is deteriorated in appearance (e.g. luster and distinctness of image gloss). Or, when pollen, dead insects, etc. on the film are wetted with rain, the proteins and amino acids contained therein dissolve in the rain and further infiltrate into the film, which may become a stain source. Further, iron dust, sand and dirt, particles in exhaust gas, etc. adhere to or stick in the film and become a stain source.

Meanwhile, the body panel of automobile, when allowed to stand outdoors, reaches even 60° C. or higher in some cases owing to the solar heat. At such high temperatures, the top coat film of body panel is softened and the above-mentioned staining easily proceeds further.

Such stains of top coat film are difficult to remove by simple wiping or use of detergent or wax, impairing the fine appearance of the film.

The main objects of the present invention are to develop a novel organic solvent type coating capable of forming a film which, as compared with the cured films formed from conventional organic solvent type coatings used as a top coat for automobile (e.g. an organic solvent type coating containing, as main components, a hydroxyl group-containing acrylic resin and a melamine resin, or a carboxylic-epoxy type coating), is at least equivalent in weatherability, finish appearance, acid resistance, etc. and good in stain resistance; and a method for applying the above coating.

The present inventors made a study in order to achieve the above objects. As a result, the present inventors found out that a cured coating film having a TUKON hardness at 20° C. of 15 or more and the minimum value of dynamic modulus E' at a frequency of 110 Hz in the temperature range of 150–200° C., of $1 \times 10^9$ dyn/cm² or more is not softened even at high temperatures of 60° C. or higher, undergoes no infiltration or sticking of staining substances, allows easy removal of staining substances adhering thereto, has very high stain resistance, and is superior in weatherability, finish appearance, acid resistance, etc. The present invention has been completed based on the above finding.

According to the present invention there is provided a thermosetting organic solvent type coating capable of forming a cured coating film having a TUKON hardness at 20° C. of 15 or more and the minimum value of dynamic modulus E' at a frequency of 110 Hz in the temperature range of 150–200° C., of $1 \times 10^9$ dyn/cm² or more.

The coating of the present invention is hereinafter described in detail.

The coating of the present invention is characterized in that by employing a special composition, the coating is capable of forming a cured film having a TUKON hardness of particular value at 20° C. and a dynamic modulus E' of particular value at a frequency of 110 Hz.

The cured film formed from the present coating is hard and has a TUKON hardness at 20° C. of 15 or more, preferably 17–25 and the minimum value of dynamic modulus E' at a frequency of 110 Hz in the temperature range of 150–200° C., of $1 \times 10^9$ dyn/cm² or more, preferably $1.1 \times 10^9$ to $8 \times 10^9$ dyn/cm², more preferably $1.2 \times 10^9$ to $5 \times 10^9$ dyn/cm².

In the present specification, "TUKON hardness at 20° C." of cured film is a value obtained when a coating is applied on a glass plate so as to give a film having a thickness of 30 μm as cured, the resulting film is heat-cured under given conditions (e.g. 140° C. and 30 minutes), and the resulting cured film is measured for hardness using a TUKON microhardness tester manufactured by American Chain & Cable Company. The larger the value, the harder is the cured film. The cured films formed from conventional thermosetting coatings, usually have TUKON hardnesses of 5–10. The present coating is capable of forming a cured film far harder than the above cured films, and the present coating has one big feature in this point.

"Dynamic modulus E' at a frequency of 110 Hz" of cured film is a value obtained when a coating is applied on a tinplate sheet so as to give a film having a thickness of 45 μm as cured, the resulting film is heat-cured at 140° C. for 30 minutes, and the resulting cured film is peeled and measured for dynamic modulus E' at a frequency of 110 Hz using an automatic dynamic viscoelastometer, RHEOVIBRON DDV-II-EA (a product of TOYO BALDWIN CO., LTD.). The dynamic modulus E' is measured at 150–200° C. and its minimum value in this temperature range is determined.

The coating of the present invention has no particular restriction as to the composition as long as it can form a cured film having the above particular values. The present coating is preferred to be, in particular, a thermosetting organic solvent type coating which comprises:

(A) a compound containing at least 2 alicyclic epoxy groups in the molecule and having a number-average molecular weight of smaller than 2,000, (B) an epoxy group-containing acrylic resin having a number-average molecular weight of 2,000–50,000, a hydroxyl value of 10–150 mg KOH/g and an epoxy equivalent of 220 or less, and (C) a thermoinitiated cationic polymerization catalyst, wherein the molar ratio of the epoxy groups of the component (A) and the epoxy groups of the component (B) is 1:1 to 1:0.05.

Specific description is made below on this preferable coating.

Component (A) Compound containing at least 2 alicyclic epoxy groups in the molecule and having a number-average molecular weight of smaller than 2,000

Herein, "alicyclic epoxy group" is a three-membered oxirane ring formed by two adjacent carbon atoms constituting the ring of an alicyclic hydrocarbon and one oxygen atom. The above alicyclic hydrocarbon can have usually 3–12, preferably 5–6 cyclic carbon atoms.

The component (A) is a compound containing, in the molecule, 2 or more, preferably 2 or 3 such alicyclic epoxy groups and having a number-average molecular weight of smaller than 2,000, preferably 100–1,500, more preferably 130–1,000. The component (A) preferably has epoxy equivalents of generally 50–500, particularly 100–300.

As the component, there can be mentioned, for example, dicyclopentadiene dioxide, bis((2,3-epoxycyclopentyl) ether, ethylene glycol bis(epoxycyclohexenecarboxylate), bis(3,4-epoxycyclohexylmethyl) adipate, bis(4,5-epoxy-2-methylcyclohexylmethyl) adipate, ethylene glycol bis(3,4-epoxycyclohexanecarboxylate), 3',4'-epoxycyclohexylmethyl-3,4-epoxycyclohexanecarboxylate, 3,4-epoxy-6-methylcyclohexylmethyl-3,4-epoxy-6-methylcyclohexanecarboxylate, 1,2,5,6-diepoxy-4,7-methanoperhydroindene, 2-(3,4-epoxycyclohexyl)-3',4'-epoxy-1,3-dioxane-5-spirocyclohexane, 1,2-ethylene-dioxy-bis(3,4-epoxycyclohexylmethane), di-2,3-epoxycyclopentyl ether and 4',5'-epoxy-2'-methylcyclohexylmethyl 4,5-epoxy-2-methylcyclohexanecarboxylate.

Component (B) Epoxy group-containing acrylic resin having a number-average molecular weight of 2,000–50,000, a hydroxyl value of 10–150 mg KOH/g and an epoxy equivalent of 220 or less The "epoxy group" possessed by the component (B) (acrylic resin) is particularly preferably the above-mentioned alicyclic epoxy group and an epoxy group derived from glycidyl (meth)acrylate. Also included is, for example, a spiro form epoxy group in which one carbon atom serves as a constituent of an alicyclic hydrocarbon ring and an oxirane ring in common. The component (B) preferably contains, in the molecule, average 2 or more, particularly average 2–1,000 such epoxy groups.

The component (B) can be produced, for example, by copolymerizing (B-1) an epoxy group-containing polymerizable monomer, (B-2) a hydroxyl group-containing polymerizable monomer, (B-3) a polymerizable acrylic monomer (these three components are essential) and, as necessary, (B-4) other polymerizable monomer.

The epoxy group-containing polymerizable monomer (B-1) is a compound having, in the molecule, at least one, preferably one epoxy group and at least one, preferably one polymerizable unsaturated double bond. Specific examples thereof are glycidyl (meth)acrylate, methylglycidyl (meth) acrylate, allyl glycidyl ether, 3,4-epoxycyclohexylmethyl (meth)acrylate, 2-(1,2-epoxy-4,7-methanoperhydroindene-5 (6)-yl)oxyethyl (meth)acrylate, 5,6-epoxy-4,7-methanoperhydroindene-2-yl (meth)acrylate, 1,2-epoxy-4, 7-methanoperhydroindene-5-yl (meth)acrylate, 2,3-epoxycyclopentenyl (meth)acrylate, (meth)acrylate of 3,4-epoxycyclohexylmethylated polycaprolactone, equal-equivalent reaction product between (meth)acrylic acid and the above-mentioned component (A), and the compounds represented by the following general formulas.

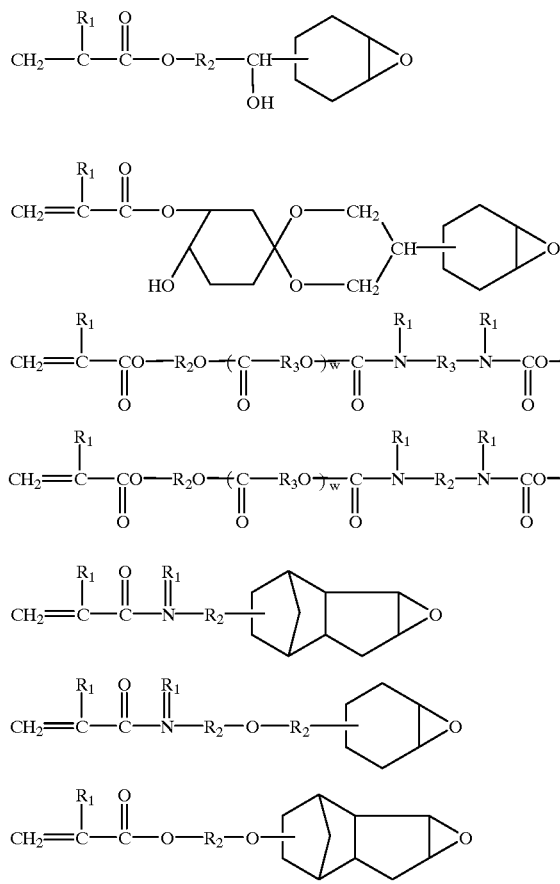
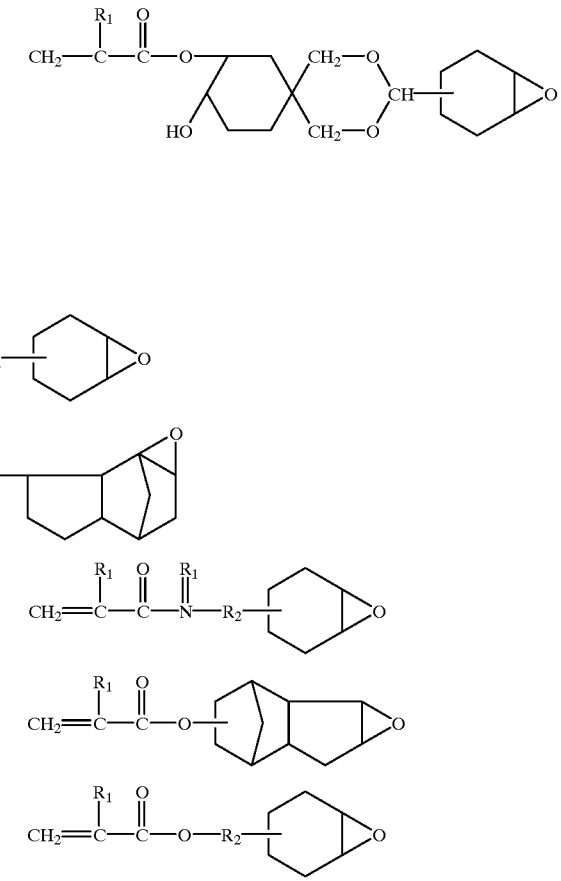

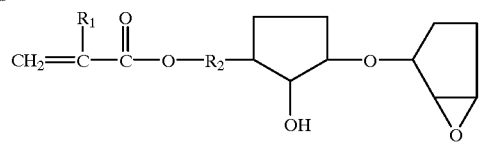

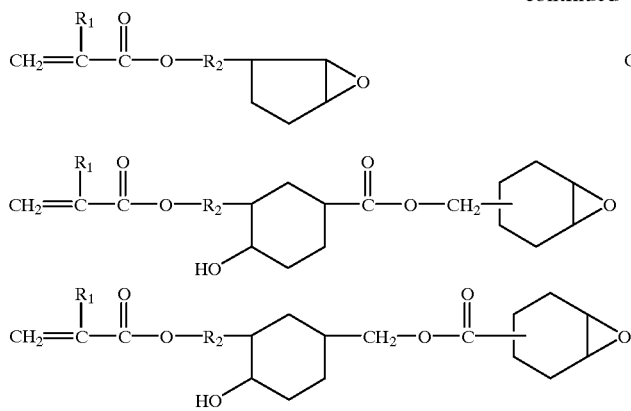

In the above formulas, $R_1$s may be the same or different and are each a hydrogen atom or a methyl group; $R_2$s may be the same or different and are each a $C_{1-8}$ hydrocarbon group; $R_3$s may be the same or different and are each a $C_{1-20}$ hydrocarbon group; and w is an integer of 0–10.

The hydroxyl group-containing polymerizable monomer (B-2) is a compound containing, in the molecule, at least one, preferably one hydroxyl group and at least one, preferably one polymerizable unsaturated double bond. Specific examples thereof are monoesters between (meth)acrylic acid and $C_{2-10}$ dialcohol (glycol), such as hydroxyethyl (meth) acrylate, hdyroxypropyl (meth)acrylate, hydroxybutyl (meth)acrylate and the like; and monesters between polyether polyol (e.g. polyethylene glycol, polypropylene glycol or polybutylene glycol) and (meth)acrylic acid.

The polymerizable acrylic monomer (B-3) includes esters between (meth)acrylic acid and aliphatic or alicyclic monoalcohol of 1–24, preferably 1–12 carbon atoms. There can be mentioned, for example, methyl (meth)acrylate, ethyl (meth)acrylate, propyl (meth)acrylate, butyl (meth)acrylate, hexyl (meth)acrylate, 2-ethylhexyl (meth)acrylate, octyl (meth)acrylate, decyl (meth)acrylate, lauryl (meth)acrylate and cyclohexyl (meth)acrylate. These monomers can be used singly or in combination of two or more kinds.

The other polymerizable monomer (B-4) is a compound other than the above-mentioned monomers and contains, in the molecule, at least one polymerizable unsaturated double bond. Specific examples thereof are the following monomers.

i) Carboxyl group-containing polymerizable monomers such as acrylic acid, methacrylic acid, crotonic acid, itaconic acid, maleic acid, fumaric acid and the like.

ii) Amide type polymerizable monomers such as N-methylol(meth)acrylamide, N-methoxymethyl (meth)acrylamide, N-butoxymethyl(meth)acrylamide and the like.

iii) Vinyl ethers such as ethyl vinyl ether, propyl vinyl ether, butyl vinyl ether, hexyl vinyl ether, cyclopentyl vinyl ether, cyclohexyl vinyl ether, phenyl vinyl ether, benzyl vinyl ether, allyl glycidyl ether and the like.

iv) Vinyl acetate, vinyl propionate, ethylene, propylene, vinyl chloride, styrene, α-methylstyrene, N,N-dimethylaminoethyl (meth)acrylate, N,N-diethylaminoethyl (meth)acrylate, (meth) acrylamide, (meth)acrylonitrile, vinylpyrrolidone, etc.

The component (B) can be produced by subjecting the monomer (B-1), the monomer (B-2), the monomer B-3) (these three monomers are essential) and, as necessary, the monomer (B-4) to, for example, ordinary solution polymerization in the presence of a radical polymerization catalyst.

The proportions of the individual monomer components used can be determined so that the epoxy group-containing acrylic resin formed has a hydroxyl value of 10–150 mg KOH/g, preferably 20–120 mg KOH/g and an epoxy equivalent of 220 or less, preferably 100–220.

The component (B) has a number-average molecular weight of preferably 2,000–50,000, particularly 3,000–20,000.

In the coating of the present invention, the component (A) and the component (B) can blended so that the molar ratio of the epoxy groups of the component (A) and the epoxy groups of the component (B) becomes the component (A):component (B)=1:1 to 1:0.05, preferably 1:0.8 to 1:0.2. Further, it is preferable that the average epoxy equivalent of the component (A) and the component (B) is generally 300 or less, particularly 100–280. Herein, "average epoxy equivalent" is the sum of (1) the product of the epoxy equivalent of component (A) and the weight proportion of component (A) in total of components (A) and (B) and (2) the product of the epoxy equivalent of component (B) and the weight proportion of component (B) in total of components (A) and (B).

Component (C) Thermoinitiated cationic polymerization catalyst

The coating of the present invention comprises a thermoinitiated cationic polymerization catalyst in addition to the components (A) and (B). The component (C) is a compound which is inactive at ordinary temperatures but, when heated to reach the critical temperature, causes cleavage to generate a cation and give rise to cationic polymerization.

The component (C) includes, for example, onium salts of nitrogen, sulfur, phosphorus or iodine whose negative ion component is $SbF_6^-$, $SbF_4^-$, $AsF_6^-$, $PF_6^-$ or he like. Specific examples of the component (C) are preferably the following compounds.

i) Quaternary ammonium salt type compounds such as N,N-dimethyl-N-benzylanilinium hexafluoroantimonate, N,N-diethyl-N-benzylanilinium tetrafluoroborate, N,N-dimethyl-N-benzylpyridinium hexafluoroantimonate, N,N-diethyl-N-benzylpyridinium trifluoromethanesulfonate, N,N-dimethyl-N-(4-methoxybenzyl)pyridinium hexafluoroantimonate, N,N-diethyl-N-(4-methoxybenzyl)pyridinium hexafluoroantimonate, N,N-diethyl-N-(4-methoxybenzyl)toluidinium hexafluoroantimonate, N,N-dimethyl-N-(4-methoxybenzyl)toluidinium hexafluoroantimonate and the like.

ii) Sulfonium salt type compounds such as triphenylsulfonium tetrafluoroborate, triphenylsulfonium hexafluoroantimonate, triphenylsulfonium hexafluoroarsenata, Adeka CP-66 (a product of Asahi Denka Kogyo K.K.), Adeka CP-77 (a product of Asahi Denka Kogyo K.K.), tri(4-methoxyphenyl)sulfonium hexafluoroarsenate. diphenyl(4-phenylthiophenyl) sulfonium hexafluoroarsenate and the like.

iii) Phosphonium salt type compounds such as ethyltriphenylphosphonium hexafluoroantimonate, tetrabutylphosphonium hexafluoroantimonate and the like.

iv) Iodonium salt type compounds such as diphenyliodonium hexafluoroarsenate, di-4-chlorophenyliodonium hexafluoroarsenate, di-4-bromophenyliodonium hexafluoroarsenate, di-p-tolyliodonium hexafluoroarsenate, phenyl(4-methoxyphenyl) iodonium hexafluoroarsenate and the like.

The cationic polymerization catalyst (C), when heated at the critical temperature (for example, about 100–180° C., preferably about 120–160° C.) for about 10–40 minutes, causes cleavage to generate a cation and give rise to cationic polymerization between the alicyclic epoxy group of component (A), the hydroxyl group of component (B) and the epoxy group of component (B). Thus, the component (C) functions so as to promote the crosslinking and three-dimensional curing of the components (A) and (B).

In the coating of the present invention, the amount of the cationic polymerization catalyst (C) used is not particularly restricted, but is generally 0.05–10 parts by weight, particularly 0.5–5 parts by weight per 100 parts by weight of the total solid content of the component (A) and the component (B).

Production of coating

The thermosetting organic solvent type coating of the present invention can be produced by dissolving or dispersing, in an organic solvent, the component (A), the component (B) and the cationic polymerization catalyst (C) all mentioned above. As the organic solvent, there can be mentioned, for example, toluene, xylene, ethyl acetate, butyl acetate, methyl ethyl ketone, methyl isobutyl ketone, cyclohexanone, isophorone, methanol, ethanol, butanol, methyl acetate, methoxybutyl acetate, cellosolve and cellosolve acetate. The organic solvent is not restricted thereto.

The coating of the present invention can as necessary comprise, in addition to the components (A), (B) and (C), ordinary additives for coating such as coloring pigment, iridescent pigment, metallic pigment, extender pigment, ultraviolet absorber, light stabilizer, fluidity-controlling agent, anti-cissing agent and the like, depending upon the application purpose.

The coating of the present invention can generally be used as a clear coating, a solid color coating, a metallic coating or a photoiridescent coating. However, being capable of forming a cured film superior in stain resistance, the present coating is most preferably used as a clear coating for forming an uppermost layer transparent film.

Further component

The coating of the present invention can further comprise, in addition to the component (A), (B) and (C), the following fourth component:

(D) a fluorine-containing resin, (E) an acylated or amino-etherified hindered amine, (F) a hydrolyzable alkoxysilyl group-containing compound, (G) a colloidal silica, or (H) a photofunctional cationic polymerization catalyst, whereby the present coating can form a cured film of even higher performance.

Component (D)

The fluorine-containing resin as necessary used as a fourth component in the present coating is a component for allowing the cured film formed from the present coating to have long-term water repellency. This resin can be used in the present coating preferably in any of the following forms.

(D-1) A non-aqueous polymer dispersion which is a dispersion of particles of a polymer containing fluoroalkyl group-containing (meth)acrylate units, in an organic solvent solution containing a dispersion stabilizer resin, the particles being insoluble in said organic solvent.

(D-2) A non-aqueous polymer dispersion which is a dispersion of polymer particles in an organic solvent solution containing a fluorine-containing dispersion stabilizer resin, the particles being insoluble in said organic solvent.

(D-3) An organic solvent solution of a fluorine-containing resin.

The component (D-1), the component (D-2) and the component (D-3) can be used singly or in any combination. Of these components, the component (D-1) is preferred because the cured film formed from the coating using the component (D-1), as compared with the film formed from the coating using the component (D-2) or (D-3), has higher stain resistance, allows easy removal of stains, and can maintain water repellency over a long period.

The component (D-1) is, as mentioned above, a non-aqueous polymer dispersion which is a dispersion of particles of a polymer containing fluoroalkyl group-containing (meth)acrylate units, in an organic solvent solution containing a dispersion stabilizer resin, the particles being insoluble in said organic solvent.

The non-aqueous polymer dispersion (D-1) is specifically a dispersion of polymer particles (c) in an organic solvent (b) containing a dispersion stabilizer resin (a), the polymer particles (c) being insoluble in the organic solvent (b) and the polymer being a copolymer between a fluoroalkyl group-containing (meth)acrylate and other polymerizable monomer.

The dispersion stabilizer resin (a) is for stably dispersing the polymer particles (c) in the organic solvent (b), and is preferably soluble or swellable in the organic solvent (b) but incompatible with the polymer particles (c). Specific examples of the dispersion stabilizer resin (a) are acrylic resin, vinyl resin, polyester resin, alkyd resin, urethane resin and fluorine-containing resin. The resin (a) can as necessary contain a functional group such as hydroxyl group, carboxyl group, epoxy group, silanol group, alkoxysilane group or the like.

The dispersion stabilizer resin (a) preferably contains an average 0.1 or more (per molecule) polymerizable double bond because such a resin can form covalent bonds with the polymer particles (c) and can allow the resulting non-aqueous polymer dispersion (D-1) to have improved storage stability, improved mechanical stability, etc.

The introduction of polymerizable double bond into the dispersion stabilizer resin (a) can be conducted by reacting the functional group present in the resin (a), with a polymerizable monomer containing a functional group reactive with the former functional group. The introduction can be conducted, for example, by reacting a carboxyl group-containing dispersion stabilizer resin with a glycidyl group-containing polymerizable monomer (e.g. glycidyl acrylate, glycidyl methacrylate or allyl glycidyl ether). The introduction can also be conducted by reacting a glycidyl group-containing dispersion stabilizer resin with a carboxyl group-containing polymerizable monomer (e.g. acrylic acid, methacrylic acid, maleic acid, fumaric acid or itaconic acid). The other combinations of the functional group of the dispersion stabilizer resin and the functional group of the polymerizable monomer include acid anhydride group and hydroxyl group, acid anhydride group and mercaptan group, and isocyanate group and hydroxyl group.

The molecular weight of the dispersion stabilizer resin (a) is not particularly restricted, but is appropriately about 3,000–100,000 in terms of weight-average molecular weight (about 1,000–60,000 in terms of number-average molecular weight), preferably about 5,000–50,000.

The organic solvent (b) includes those organic solvents which can dissolve the dispersion stabilizer resin (a) and the fluoroalkyl group-containing (meth)acrylate and other polymerizable monomer both used for production of the polymer particles (c) but do not substantially dissolve the polymer particles (c). Therefore, the organic solvent (b) is determined by the compositions, molecular weights, etc. of the dispersion stabilizer resin (a) and the polymer particles (c) both actually used. As the organic solvent (b), there can be mentioned, for example, aliphatic hydrocarbons such as hexane, heptane, octane and the like; aromatic hydrocarbons such as benzene, xylene, toluene, and the like; alicyclic hydrocarbons such as cyclohexane and the like; esters such as methyl acetate, ethyl acetate, isobutyl acetate, acyl acetate, ethylene glycol monomethyl ether acetate, 2-ethylhexyl acetate, diethylene glycol monomethyl ether acetate and the like; ethers such as cellosolve, butyl cellosolve, isopropyl ether, ethylene glycol monomethyl ether, diethylene glycol monobutyl ether and the like; alcohols such as ethyl alcohol, isopropyl alcohol, n-butyl alcohol, isobutyl alcohol, octyl alcohol, hexyl alcohol and the like; and ketones such as methyl isobutyl ketone, diisobutyl ketone, methyl ethyl ketone, isophorone, acetophenone, ethyl acyl ketone, methyl acyl ketone, ethyl butyl ketone and the like. It is generally preferable to use, as the organic solvent (b), a combination of an aliphatic hydrocarbon (a main solvent) with other organic solvent such as aromatic hydrocarbon, alcohol, ether, ester, ketone or the like.

The non-aqueous polymer dispersion (D-1) can be produced, for example, by copolymerizing a fluoroalkyl group-containing (meth)acrylate and other polymerizable monomer in a mixture of the dispersion stabilizer resin (a) and the organic solvent (b) to form polymer particles insoluble in the mixture.

The fluoroalkyl group-containing (meth)acrylate (hereinafter referred to as F-acrylate) used for obtaining the polymer particles (c) includes, for example, a compound represented by the following general formula:

$$CH_2=C(R)-COO-(CH_2)_n-Rf$$

wherein R is a hydrogen atom or a methyl group; n is an integer of 1–10; and Rf is a straight-chain or branched chain fluoroalkyl group having 1–21, preferably 1–10 carbon atoms. Herein, "fluoroalkyl group" is a straight-chain or branched chain hydrocarbon group wherein part or all of the hydrogens bonding to the carbons are replaced by fluorine.

As the F-acrylate, there can be mentioned, for example, perfluoromethylmethyl acrylate, perfluoromethylmethyl methacrylate, perfluorobutylethyl acrylate, perfluorobutyl- ethyl methacrylate, perfluoroisononylethyl acrylate, perfluoroisononylethyl methacrylate, perfluorooctylethyl acrylate, perfluorooctylethyl methacrylate, 2,2,3,3-tetrafluoropropyl acrylate, 2,2,3,3-tetrafluoropropyl methacrylate, 1H,1H,5H-octafluoropentyl acrylate and 1H,1H,5H-octafluoropentyl methacrylate.

The "other polymerizable monomer" copolymerized with the F-acrylate is not particularly restricted as to the kind as long as it is a radical-polymerizable unsaturated monomer. Representative examples thereof are as follows.

(i) Esters of (meth)acrylic acid: $C_{1-20}$ alkyl (meth)acrylates such as methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobornyl acrylate, isobornyl methacrylate, hexyl acrylate, hexyl methacrylate, octyl acrylate, octyl methacrylate, lauryl acrylate, lauryl methacrylate and the like; $C_{3-20}$ cycloalkyl (meth)acrylates such as cyclohexyl acrylate, cyclohexyl methacrylate and the like; $C_{2-8}$ alkenyl (meth)acrylates such as allyl acrylate, allyl methacrylate and the like; $C_{3-20}$ alkenyloxyalkyl (meth)acrylates such as allyloxyethyl acrylate, allyloxyethyl methacrylate and the like; and so forth.

(ii) Glycidyl group-containing unsaturated monomers such as glycidyl acrylate, glycidyl methacrylate and the like.

(iii) Hydroxyl group-containing monomers: $C_{2-8}$ hydroxyalkyl (meth)acrylates such as hydroxyethyl acrylate, hydroxyethyl methacrylate, hdyroxypropyl acrylate, hydroxypropyl methacrylate and the like; hydroxyalkyl vinyl ethers such as hydroxybutyl vinyl ether and the like; allyl alcohol; methallyl alcohol; and so forth.

(iv) Alkoxysilane group-containing unsaturated monomers such as γ-acryloyloxypropyltrimethoxysilane, γ-methacryloyloxypropyltrimethoxysilane, β-acryloyloxyethyltrimethoxysilane, γ-methacryloyloxyethyltrimethoxysilane, γ-acryloyloxypropyltriethoxysilane, γ-methacryloyloxypropyltriethoxysilane, vinyltrimethoxysilane, vinyltriethoxysilane, vinyltris-(2-methoxyethoxy)silane and the like.

(v) Unsaturated carboxylic acids such as acrylic acid, methacrylic acid, itaconic acid, maleic acid, fumaric acid, crotonic acid and the like.

(vi) Isocyanate group-containing unsaturated monomers such as isocyanatoethyl acrylate, m-isopropenyl-α,α-dimethylbenzyl isocyanate and the like.

(vii) Unsaturated monomers having 2 or more polymerizable unsaturated bonds, such as ethylene glycol diacrylate, ethylene glycol dimethacrylate, diethylene glycol diacrylate, diethylene glycol dimethacrylate, trimethylolpropane triacrylate, trimethylolpropane trimethacrylate and the like.

(viii) Vinyl aromatic compounds such as styrene, α-methylstyrene, vinyltoluene, p-chlorostyrenevinylpyridiene and the like.

(ix) Other monomers such as acrylonitrile, methacrylonitrile, methyl isopropenyl ketone, vinyl acetate, Veova monomer (trade name of a product of Shell Chemical Co., Ltd.), vinyl propionate, vinyl pivalate, ethylene, propylene, butadiene, N,N-dimethylaminoethyl acrylate, N,N-dimethylaminoethyl methacrylate, acrylamide, vinylpyridine and the like.

In the non-aqueous polymer dispersion (D-1), the proportions of the F-acrylate and the other polymerizable monomer used in their copolymerization are not particularly restricted; however, the appropriate proportion of the F-acrylate is 90-1%, particularly 60-3%, more particularly 30-5% and the appropriate proportion of the other polymerizable monomer is 10–99%, particularly 40–97%, more particularly 70–95%, both based on the total weight of the two monomers.

The copolymerization of the F-acrylate and the other polymerizable monomer is preferably conducted generally in the presence of a radical polymerization initiator. As the polymerization initiator usable, there can be mentioned, for example, azo type initiators such as 2,2-azoisobutyronitrile, 2,2'-azobis(2,4-dimethylvaleronitrile) and the like; and peroxide type initiators such as benzoyl peroxide, lauryl peroxide, tert-butyl peroctoate and the like. The amount of the initiator used is preferably 0.2–10 parts by weight, more preferably 0.5–5 parts by weight per 100 parts by weight of the total of the F-acrylate and the other polymerizable monomer.

By using, as the other polymerizable monomer, the glycidyl group-containing unsaturated monomer (ii), the hydroxyl group-containing unsaturated monomer (iii), the alkoxysilane group-containing unsaturated monomer (iv), the unsaturated carboxylic acid (v), the isocyanate group-containing unsaturated monomer (vi) or the like, it is possible to introduce, into the polymer articles (c), a functional group such as hydroxyl group, carboxyl group, epoxy group, silanol group, alkoxysilane group, isocyanate group or the like.

By using the unsaturated monomer (vii) having 2 or more polymerizable unsaturated bonds, it is possible to obtain polymer particles (c) having intra-particle crosslinking.

The copolymerization of the F-acrylate and the other polymerizable monomer in the organic solvent (b) containing the dispersion stabilizer resin (a) is preferably conducted generally at 60–160° C. for about 1–20 hours. The resulting non-aqueous polymer dispersion (D-1) has very high dispersion stability.

In the dispersion (D-1), the proportions of the dispersion stabilizer (a) and the polymer particles (c) are not strictly restricted; however, it is preferable that (a) is generally 3–70%, particularly 5–60% and (c) is generally 97-30%, particularly 95-40%, both based on the total solid weight of the two components. In the dispersion (D-1). the total amount of the dispersion stabilizer (a) and the polymer particles (c) is preferably 30–70%, particularly 40–60% based on the total weight of the components (a), (b) and (c).

The component (D-2) is a non-aqueous polymer dispersion which is a dispersion of polymer particles in an organic solvent solution containing a fluorine-containing dispersion stabilizer resin, the particles being insoluble in said organic solvent.

The non-aqueous polymer dispersion (D-2) is specifically a non-aqueous dispersion wherein polymer particles (f) are dispersed in an organic solvent (e) containing a fluorine-containing dispersion stabilizer resin (d), the polymer particles (f) being insoluble in the organic solvent (e).

The dispersion stabilizer resin (d) contains fluorine atom in the molecule, is for stably dispersing the polymer particles (f) in the organic solvent (e), and is preferably soluble or swellable in the organic solvent (e) but incompatible with the polymer particles (f).

The dispersion stabilizer resin (d) is a (co)polymer containing fluorine-containing polymerizable monomer units, which can optionally contain at least one (per 1 molecule) functional group such as hydroxyl group, carboxyl group, epoxy group, silanol group, alkoxysilane group, isocyanate group or the like.

As the fluorine-containing polymerizable monomer usable in production of the dispersion stabilizer resin (d), there can be mentioned, for example, F-acrylates such as mentioned with respect to the polymer particles (c) of the component (D-1); and fluoroolefins such as tetrafluoroethylene, hexafluoropropylene, chlorotrifluoroethylene, vinyl fluoride, vinylidene fluoride, trifluoroethylene and the like.

The dispersion stabilizer resin (d) can be produced by (co)polymerizing at least one kind of the above-mentioned fluorine-containing polymerizable monomer, or by copolymerizing the monomer with other polymerizable monomer. As the other polymerizable monomer, there can be mentioned monomers such as mentioned with respect to the polymer particles (c) of the component (D-1). Specific examples thereof are:

(i) $C_{1-20}$ alkyl (meth)acrylates, $C_{3-20}$ cycloalkyl (meth)acrylates, $C_{2-8}$ alkenyl (meth)acrylates, $C_{3-20}$ alkenyloxyalkyl (meth)acrylates, etc., (ii) glycidyl group-containing unsaturated monomers, (iii) $C_{2-8}$ hydroxyalkyl (meth)acrylates, hydroxyalkyl vinyl ethers, allyl alcohol, methallyl alcohol, etc., (iv) alkoxysilane group-containing unsaturated monomers, (v) unsaturated carboxylic acids, (vi) isocyanate group-containing unsaturated monomers, (vii) unsaturated monomers having at least 2 polymerizable unsaturated bonds, (viii) vinyl aromatic compounds, and (ix) other polymerizable monomers such as acrylonitrile, methacrylonitrile, methyl isopropenyl ketone, vinyl acetate, Veova monomer (trade name of a product of Shell Chemical Co., Ltd.), vinyl propionate, vinyl pivalate, ethylene, propylene, butadiene, N,N-dimethylaminoethyl acrylate, N,N-dimethylaminoethyl methacrylate, acrylamide, vinylpyridine and the like.

When the fluorine-containing polymerizable monomer is polymerized optionally with the other polymerizable monomer, the proportions of the two monomers are preferably such that the former is generally 100-1%, particularly 30-5% and the latter is generally 0–99%, particularly 70–95%, both based on the total weight of the two monomers.

The polymerization of the fluorine-containing polymerizable monomer or the copolymerization of the fluorine-containing polymerizable monomer with the other polymerizable monomer is preferably conducted usually by radical polymerization. The preferable radical polymerization iniitator used to accelerate the (co)polymerization is exemplified by azo type initiators such as 2,2-azoisobutyronitrile, 2,2'-azobis(2,4-dimethylvaleronitrile) and the like; and peroxide type initiators such as benzoyl peroxide, lauryl peroxide, tert-butyl peroctoate and the like. The amount of the initiator used is preferably 0.2–10 parts by weight, more preferably 0.5–5 parts by weight per 100 parts by weight of the total polymerizable monomers. In production of the dispersion stabilizer resin (d), by using, as the other polymerizable monomer, (ii) a glycidyl group-containing unsaturated monomer, (iii) a hydroxyl group-containing unsaturated monomer, (iv) an alkoxysilane group-containing unsaturated monomer, (v) an unsaturated carboxylic acid, (vi) an isocyanate group-containing unsaturated monomer, or the like, there can be obtained a dispersion stabilizer resin (d) having functional group such as hydroxyl group, carboxyl group, epoxy group, silanol group, alkoxysilane group, isocyanate group or the like.

The dispersion stabilizer resin (d) preferably contains an average 0.1 or more (per molecule) polymerizable double bond because such a resin can form covalent bonds with the polymer particles (f) and can allow the resulting non-aqueous polymer dispersion (D-2) to have improved storage stability, improved mechanical stability, etc.

The introduction of polymerizable double bond into the dispersion stabilizer resin (d) can be conducted by reacting the functional group present in the resin (d), with a polymerizable monomer containing a functional group reactive with the former functional group. The introduction can be conducted, for example, by reacting a carboxyl group-containing dispersion stabilizer resin with a glycidyl group-containing polymerizable monomer (e.g. glycidyl acrylate, glycidyl methacrylate or allyl glycidyl ether). The introduction can also be conducted by reacting a glycidyl group-containing dispersion stabilizer resin with a carboxyl group-containing polymerizable monomer (e.g. acrylic acid, methacrylic acid, maleic acid, fumaric acid or itaconic acid). The other combinations of the functional group of the dispersion stabilizer resin and the functional group of the polymerizable monomer include acid anhydride group and hydroxyl group, acid anhydride group and mercaptan group, and isocyanate group and hydroxyl group.

The molecular weight of the dispersion stabilizer resin (d) is not particularly restricted, but is appropriately about 3,000–100,000 in terms of weight-average molecular weight (about 1,000–60,000 in terms of number-average molecular weight), preferably about 5,000–50,000.

The organic solvent (e) includes those organic solvents which can dissolve the polymerizable monomer used for production of the polymer particles (f) but do not substantially dissolve the polymer particles (f) produced from the monomer. Therefore, the organic solvent (e) is determined by the compositions, molecular weights, etc. of the dispersion stabilizer resin (e) and the polymer particles (f) both actually used. It is preferable to use, as the organic solvent (e), a solvent selected from those specific solvents mentioned with respect to the organic solvent (b).

The non-aqueous polymer dispersion (D-2) can be produced by polymerizing a polymerizable monomer in a mixture of the fluorine-containing dispersion stabilizer resin (d) and the organic solvent (e) to form polymer particles (f) insoluble in the mixture.

The polymerizable monomer for forming the polymer particles (f) is not particularly restricted as to the kind as long as it is a radical-polymerizable unsaturated monomer. As specific examples of the polymerizable monomer, there can be mentioned the following polymerizable monomers mentioned with respect to the "other polymerizable monomer" for the polymer particles (c) of the component (D-1).

(i) $C_{1-20}$ alkyl (meth)acrylates, $C_{3-20}$ cycloalkyl (meth)acrylates, $C_{2-8}$ alkenyl (meth)acrylates, $C_{3-20}$ alkenyloxyalkyl (meth)acrylates, etc.

(ii) Glycidyl group-containing unsaturated monomers.

(iii) $C_{2-8}$ hydroxyalkyl (meth)acrylates, hydroxyalkyl vinyl ethers, allyl alcohol, methallyl alcohol, etc.

(iv) Alkoxysilane group-containing unsaturated monomers.

(v) Unsaturated carboxylic acids.

(vi) Isocyanate group-containing unsaturated monomers.

(vii) Unsaturated monomers having 2 or more polymerizable unsaturated bonds.

(viii) Vinyl aromatic compounds.

(ix) Other monomers such as acrylonitrile, methacrylonitrile, methyl isopropenyl ketone, vinyl acetate, Veova monomer (trade name of a product of Shell Chemical Co., Ltd.), vinyl propionate, vinyl pivalate, ethylene, propylene, butadiene, N,N-dimethylaminoethyl acrylate, N,N-dimethylaminoethyl methacrylate, acrylamide, vinylpyridine and the like.

The polymerizable monomer for producing the polymer particles (f) may be used in combination with the above-mentioned fluorine-containing polymerizable monomer (F-acrylate and/or fluoroolefin).

The polymerization of the polymerizable monomer is preferably conducted in the presence of a radical polymerization initiator. As the radical polymerization initiator, there can be mentioned, for example, azo type initiators such as 2,2-azoisobutyronitrile, 2,2'-azobis(2,4-dimethylvaleronitrile) and the like; and peroxide type initiators such as benzoyl peroxide, lauryl peroxide, tert-butyl peroctoate and the like. The preferable amount of the initiator used is usually 0.2–10 parts by weight, preferably 0.5–5 parts by weight per 100 parts by weight of the total polymerizable monomers.

By using, as the polymerizable monomer for producing the polymer particles (f), (ii) a glycidyl group-containing unsaturated monomer, (iii) a hydroxyl group-containing unsaturated monomer, (iv) an alkoxy-silane group-containing unsaturated monomer, (v) an unsaturated carboxylic acid, (vi) an isocyanate group-containing unsaturated monomer, or the like, there can be obtained polymer particles (f) containing functional group such as hydroxyl group, carboxyl group, epoxy group, silanol group, alkoxysilane group, isocyanate group or the like. By using (vii) an unsaturated monomer having at least 2 polymerizable unsaturated bonds, there can be obtained polymer particles (f) having intra-particle crosslinking.

Polymerization of the polymerizable monomer in the organic solvent (e) containing the dispersion stabilizer resin (d) is preferably conducted generally at 60–160° C. for about 1–20 hours. The resulting non-aqueous polymer dispersion (D-2) has very high dispersion stability.

In the non-aqueous polymer dispersion (D-2), the proportions of the dispersion stabilizer resin (d) and the polymer particles ((f) can be varied in a wide range, but are preferably such that the resin (d) is generally 3–70%, particularly 5–60% and the particles (f) are generally 97-30%, particularly 95-40%, both based on the total solid weight of the two components. The preferable total solid amount of the resin (d) and the particles (f) in the dispersion (D-2) is generally 30–70%, particularly 40–60% based on the total weight of the resin (d), the organic solvent (e) and the particles (f).

The component (D-3) is an organic solvent solution of a fluorine-containing resin (g), and can be produced by dissolving a fluorine-containing resin in an organic solvent.

The fluorine-containing resin (g) used in the component (D-3) can be produced, for example, by (co)polymerizing at least one fluorine-containing polymerizable monomer selected from fluoroalkyl group-containing (meth)acrylates and fluoroolefins, or by copolymerizing said fluorine-containing polymerizable monomer and other polymerizable monomer.

The fluoroalkyl group-containing (meth)acrylate is a compound represented by the following general formula:

$$CH_2=C(R)-COO-(CH_2)_n-Rf$$

wherein R is a hydrogen atom or a methyl group; n is an integer of 1–10; and Rf is a $C_{1-21}$ straight-chain or branched chain fluoroalkyl group. As the fluoroalkyl group-containing (meth)acrylate, there can be used those monomers mentioned with respect to the polymer particles (c) of the component (D-1). As the fluoroolefin, there can be used those monomers mentioned with respect to the production of the dispersion stabilizer resin (d) of the component (D-2).

The other polymerizable monomer copolymerized with the fluorine-containing polymerizable monomer is not particularly restricted as to the kind as long as it is a radical-polymerizable unsaturated monomer. As typical examples of the other polymerizable monomer, there can be mentioned those monomers mentioned with respect to the polymer particles (c) of the component (D-1). Specific examples thereof are as follows.

(i) $C_{1-20}$ alkyl (meth)acrylates, $C_{3-20}$ cycloalkyl (meth)acrylates, $C_{2-8}$ alkenyl (meth)acrylates, $C_{3-20}$ alkenyloxyalkyl (meth)acrylates, etc.

(ii) Glycidyl group-containing unsaturated monomers.

(iii) $C_{2-8}$ hydroxyalkyl (meth)acrylates, hydroxyalkyl vinyl ethers, allyl alcohol, methallyl alcohol, etc.

(iv) Alkoxysilane group-containing unsaturated monomers.

(v) Unsaturated carboxylic acids.

(vi) Isocyanate group-containing unsaturated monomers.

(vii) Unsaturated monomers having 2 or more polymerizable unsaturated bonds.

(viii) Vinyl aromatic compounds.

(ix) Other monomers such as acrylonitrile, methacrylonitrile, methyl isopropenyl ketone, vinyl acetate, Veova monomer (trade name of a product of Shell Chemical Co., Ltd.), vinyl propionate, vinyl pivalate, ethylene, propylene, butadiene, N,N-dimethylaminoethyl acrylate, N,N-dimethylaminoethyl methacrylate, acrylamide, vinylpyridine and the like.

The proportions of the fluorine-containing polymerizable monomer and the optional other polymerizable monomer used in their copolymerization are preferably such that the former is generally 100-1%, particularly 30-5% and the latter is generally 0–99%, particularly 70–95%, both based on the total weight of the two components.

The polymerization of the fluorine-containing polymerizable monomer or the copolymerization of the fluorine-containing polymerizable monomer and the other polymerizable monomer is preferably conducted by radical polymerization. To accelerate the polymerization, a radical polymerization initiator is used. Preferable as the radical polymerization initiator are, for example, azo type initiators such as 2,2-azoisobutyronitrile, 2,2'-azobis(2,4-dimethylvaleronitrile) and the like; and peroxide type initiators such as benzoyl peroxide, lauryl peroxide, tert-butyl peroctoate and the like. The amount of the initiator used is preferably 0.2–10 parts by weight, more preferably 0.5–5 parts by weight per 100 parts by weight of the total polymerizable monomers.

By using, as the other polymerizable monomer for producing the fluorine-containing resin (g), (ii) a glycidyl group-containing unsaturated monomer, (iii) a hydroxyl group-containing unsaturated monomer, (iv) an alkoxysilane group-containing unsaturated monomer, (v) an unsaturated carboxylic acid, (vi) an isocyanate group-containing unsaturated monomer, or the like, there can be obtained a fluorine-containing resin containing functional group such as hydroxyl group, carboxyl group, epoxy group, silanol group, alkoxysilane group, isocyanate group or the like.

The molecular weight of the fluorine-containing resin (g) is not particularly restricted, but appropriately is about 3,000–100,000 in terms of weight-average molecular weight (about 1,000–60,000 in terms of number-average molecular weight), preferably about 5,000–50,000. The organic solvent used for dissolving the fluorine-containing resin is not particularly restricted as to the kind as long as it can dissolve the fluorine-containing resin; and there can be preferably used those organic solvents mentioned with respect to the organic solvent (b) of the component (D-1).

The amount of the component (D) used in the present coating can be varied depending upon the application purpose of the coating, etc., but appropriately is generally 0.5–40 parts by weight, particularly 2–30 parts by weight per 100 parts by weight of the total solid content of the component (A) and the component (B). When the component (D) contains epoxy group, the molar ratio of the alicyclic epoxy groups of the component (A) and the total epoxy groups of the component (B) and the component (D) is in the range of preferably 1:1 to 1:0.05, particularly 1:0.8 to 1:0.2.

Component (E) Acylated or amino-etherified hindered amine

By allowing the coating of the present invention to comprise an acylated or amino-etherified hindered amine as the fourth component, the resulting coating can form a cured film significantly improved in stain resistance, particularly in long-term stain resistance.

The acylated or amino-etherified hindered amine (E) is an acylation or amino-etherification product of a piperidine derivative, and has a radical-capturing function. Specific examples of the component (E) are compounds (E-1), (E-2) and (E-3) represented by the following structural formulas, respectively.

Compound (E-1):

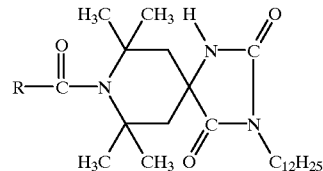

Compound (E-2):

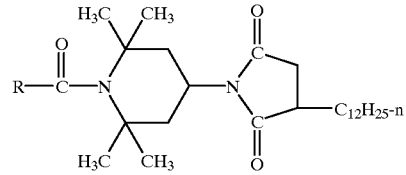

Compound (E-3):

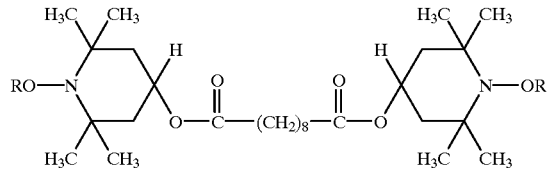

In the above formulas, each R is an alkyl group having 1–20, preferably 1–10 carbon atoms, such as methyl group, ethyl group, propyl group, butyl group, hexyl group, octyl group or the like.

Preferable examples of these compounds are 8-acetyl-3-dodecyl-7,7,9,9-tetramethyl-1,3,8-triaza-spiro(4,5)-decane-2,4-dione, N-acetyl-3-dodecyl-1,1(2,2,6,6-tetraethyl-1,4-piperidinyl)pyrrolidine-2,5-dione, bis(N-octoxy-2,2,6,6-tetramethyl-4-piperidyl) sebacate.

In the coating of the present invention, the amount of the component (E) used can be varied depending upon the application purpose of the coating, but appropriately is generally 0.01–10 parts by weight, particularly 0.2–5 parts by weight per 100 parts by weight of the total solid content of the component (A) and the component (B).

Component (F) Hydrolyzable alkoxysilyl group-containing compound

By allowing the coating of the present invention to comprise a hydrolyzable alkoxysilyl group-containing compound as the fourth component, the resulting coating can form a cured film having hydrophilicity: as a result, the staining substances adhering to the film can be easily washed away by rain or the like, the stains on the film can be removed without wiping, and the film has stain resistance over a long period of time and requires no washing of vehicle body.

The hydrolyzable alkoxysilyl group-containing compound (F) used for the above merits includes the followings, for example.

(F-1): A condensate of tetramethyl silicate and/or tetraethyl silicate, having a low condensation degree of 2–10.

(F-2): A partial hydrolysis condensate of a silane mixture of 100 parts by weight of an alkoxysilane compound (a) containing at least one organic functional group selected from the group consisting of mercapto group, epoxy group, (meth)acryloyl group and vinyl group and 20–2,000 parts by weight of a tetraalkoxysilane compound (b).

(F-3): An organic functional group- and hydrolyzable group-containing silicone compound having an average polymerization degree of 3–100, preferably 5–80, obtained by cocondensing under hydrolysis conditions: 5–80 mole %, preferably 10–50 mole % in total, of (1) a compound (1-i) represented by the following general formula:

$$R^1R^2Si(Z)_2$$

(wherein $R^1$ is an organic functional group selected from epoxy group, mercapto group, (meth)acryloyl group and vinyl group; $R^2$ is a $C_{1-3}$ alkyl group; and Z is a hydrolyzable group) and/or a compound (1-ii) represented by the following general formula:

$$R^1Si(Z)_3$$

(wherein $R^1$ and Z have the same definitions as given above), 0.1–30 mole %, preferably 1–25 mole % of (2) a compound represented by the following general formula:

$$R^2Si(Z)_3$$

(wherein $R^2$ and Z have the same definitions as given above), and

10–94.9 mole %, preferably 25–90 mole % of (3) a compound represented by the following general formula:

$$Si(Z)_4$$

(wherein Z has the same definition as given above), the total amount of the compound (2) and the compound (3) being 20–95 mole %, preferably 30–80 mole %.

As the component (F), there can be used at least one component selected from the components (F-1), (F-2) and (F-3).

The component (F-1), which is a condensate of tetramethyl silicate and/or tetraethyl silicate, having a low condensation degree of 2–10, may be a homocondensate of tetramethyl silicate or tetraethyl silicate, of low condensation degree, or a cocondensate of the two silicates, of low condensation degree. The condensation degree is preferably 2–8.

The preferable proportion of the component (F-1) in the coating of the present invention is generally about 0.1–50 parts by weight, particularly about 1–20 parts by weight per 100 parts by weight of the total solid content of the component (A) and the component (B).

The cured film formed from the coating of the present invention comprising the component (F-1) reduces its contact angle to water gradually when the film is exposed outdoors or to other places and comes in contact with an acid such as contained in acid rain; as a result, the staining substances adhering to the film are easily washed away. Therefore, the cured film has significantly high stain resistance.

Further, the above cured film may be subjected to an acid treatment (for example, immersion in an aqueous acid solution having a pH of 6 or less, at about 5–98° C.) before the film is exposed outdoors or to other places, whereby the film can exhibit high stain resistance from the initial stage.

The component (F-2) can be produced by subjecting a mixture of (i) an alkoxysilane compound having at least one kind of organic functional group selected from mercapto group, epoxy group, (meth)acryloyl group and vinyl group and (ii) an tetraalkoxysilane compound to partial hydrolysis cocondensation.

As the organic functional group-containing alkoxysilane compound (i) which is a starting material, there can be used an alkoxysilane compound wherein the organic functional group is bonded directly to the silicon atom, or an alkoxysilane compound wherein the organic functional group is bonded to the silicon atom via $C_{1-10}$ bivalent hydrocarbon group. The number of the alkoxysilyl groups bonding to silicon is preferably 2 or 3. As such a compound, there can be used a per se known compound, and specific examples thereof are as follows.

Mercapto group-containing alkoxysilane compounds such as γ-mercaptopropyltrimethoxysilane, γ-mercaptopropyltriethoxysilane, γ-mercaptopropyltributoxysilane, γ-mercaptopropylmethyldimethoxysilane, γ-mercaptopropylmethyldiethoxysilane, β-mercaptomethylphenylethyltrimethoxysilane, mercaptomethyltrimethoxysilane, 6-mercaptohexyltrimethoxysilane, 10-mercaptodecyltrimethoxysilane and the like.

Epoxy group-containing alkoxysilane compounds such as γ-glycidoxypropyltrimethoxysilane, γ-glycidoxypropyltriethoxysilane, γ-glycidoxypropyltributoxysilane, γ-glycidoxypropyltriisopropenoxysilane, γ-glycidoxypropylmethyldimethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethylmethyldiethoxysilane, 5,6-epoxycyclohexyltrimethoxysilane, 9,10-epoxydecyltrimethoxysilane and the like.

(Meth)acryloyl group-containing alkoxysilane compounds such as γ-methacryloxypropyltrimethoxysilane, γ-methacryloxypropyltriethoxysilane, γ-methacryloxypropyltributoxysilane, γ-methacryloxypropylmethyldimethoxysilane, γ-methacryloxypropylmethyldiethoxysilane, γ-acryloxypropyltrimethoxysilane,
γ-acryloxypropyltriethoxysilane,
γ-acryloxypropylmethyldimethoxysilane,
γ-methacryloxymethyltrimethoxysilane, and the like.

Vinyl group-containing alkoxysilane compounds such as vinyltrimethoxysilane, vinyltriethoxysilane, vinyltributoxysilane, vinylmethyldimethoxysilane, 5-hexenyltrimethoxysilane, 9-decenyltrimethoxysilane, styryltrimethoxysilane and the like.

These organic group-containing alkoxysilane compounds can be used singly or in admixture of plurality of kinds.

Of the above compounds, preferred are mercapto group-containing alkoxysilanes and epoxy group-containing alkoxysilanes because the present coating comprising such a compound can give a cured film excellent in stain resistance, durability, etc.

The organic functional group in the component (F-2) forms a chemical bond with the component (A) and/or the component (B) in the present coating owing to a chemical reaction with them, or forms a hydrogen bond with them owing to the polar structure, or interacts with them owing to the compatibility, whereby the component (F-2) is not detached from the cured film formed from the present coating.

As the tetraalkoxysilane compound (ii) reacted with the organic functional group-containing alkoxysilane compound (i), there can be mentioned, for example, tetramethoxysilane, tetraethoxysilane, tetraisopropoxysilane and tetrabutoxysilane. These compounds can be used singly or in combination of two or more kinds. Of these, tetramethoxysilane or tetraethoxysilane is particularly preferred because the alkoxysilane group hydrolyzes easily to form silanol group and thereby a cured film excellent in stain resistance can be formed.

The preferable proportion of the tetraalkoxysilane compound (ii) relative to the organic functional group-containing alkoxysilane compound (i) is generally 20–2,000 parts by weight, particularly 50–1,000 parts by weight per 100 parts by weight of the latter (i).

The component (F-2) can be produced according to a per se known method, for example, by adding water to a mixture of the organic functional group-containing compound (i) and the tetraalkoxysilane compound (ii) in the presence of a hydrolysis catalyst to give rise to partial hydrolysis cocondensation.

In the partial hydrolysis cocondensation, the degree of partial cohydrolysis has a close connection with the polymerization degree. For example, when no hydrolysis occurs, the average polymerization degree is 0 (zero) and, when the hydrolysis is 100%, the polymerization degree is too high and gelation takes place. Therefore, in the component (F-2) used in the present invention, the average polymerization is controlled preferably at 3–100, particularly at 5–80.

As the hydrolysis condensation catalyst, various catalysts known per se can be used. Specific examples are organic acids such as acetic acid, butyric acid, maleic acid, citric acid and the like; inorganic acids such as hydrochloric acid, nitric acid, phosphoric acid, sulfuric acid and the like; basic compounds such as triethylamine and the like; organic metal salts such as tetrabutyl titanate, dibutyltin dilaurate and the like; and fluorine-containing compounds such as KF, $NH_4F$ and the like. These catalysts can be used singly or in combination of a plurality of kinds. Of these catalysts, the fluorine-containing compounds have high catalytic activity for condensation of reactive silanol group and are suitably used in synthesis of a partial hydrolysis cocondensate low in silanol group content and capable of giving a coating of good storage stability. The preferable amount of the hydrolysis condensation catalyst used is usually 0.001–1 mole %.

In carrying out the partial hydrolysis cocondensation, an organic solvent may be used as necessary. The organic solvent usable can be exemplified by alcohols such as methanol, ethanol, isopropanol, tert-butanol and the like; ketones such as acetone, methyl isobutyl ketone and the like; ethers such as dibutyl ether and the like; esters such as ethyl acetate and the like; and aromatic hydrocarbons such as toluene and the like. Particularly preferred are methanol, ethanol, acetone, etc.

The amount of water used in partial hydrolysis cocondensation can be determined by the desired degree of polymerization. Addition of water in excess causes destruction of alkoxy group and ultimately invites gelation; therefore, the amount of water used is desired to be determined strictly. Particularly when a fluorine-containing compound is used as the hydrolysis condensation catalyst, since the fluorine-containing compound is able to give rise to complete hydrolysis condensation, the degree of polymerization can be determined by the amount of water added and any desired molecular weight can be obtained. For example, in producing a product of average polymerization degree of M, (M-1) moles of water is used for M moles of an alkoxysilane compound. When other hydrolysis condensation catalyst is used, water is needed in a slightly larger amount usually. The partial hydrolysis cocondensation can be conducted generally at a temperature ranging from room temperature to 150° C. or less.

In the coating of the present invention, the proportion of the component (F-2) used can be generally 0.1–50 parts by weight, preferably 1–20 parts by weight per 100 parts by weight of the total solid content of the component (A) and the component (B).

In the component (F-3), the hydrolyzable group (Z) in the general formulas (1) to (3) can be a per se known group such as methoxy group, ethoxy group, propoxy group, isopropenoxy group, acetoxy group, butanoxy group or the like. A plurality of hydrolyzable groups may be the same or different from each other. Methoxy group and ethoxy group are particularly preferred because they give a coating of good storage stability and further because they are easily hydrolyzed and exhibit stain resistance at an early timing.

The alkyl group represented by $R^2$ of the general formulas (1) to (3) is preferably a $C_{1-3}$ alkyl group such as methyl group, ethyl group or propyl group. Of these, methyl group has the lowest hydrophobicity and shows excellent stain resistance.

The organic functional group $R^1$ in the compounds (1-i) and (1-ii) forms a chemical bond with the component (A) and the component (B) owing to a chemical reaction with them, or forms a hydrogen bond with them owing to the polar structure, or interacts with them owing to the compatibility, whereby the component (F-3) is not detached from the cured film formed from the present coating. The organic functional group may be bonded directly to the silicon of the compounds (1-i) and (1-ii), or may be bonded to the silicon via an organic substituent.

As the organic functional group $R^1$, there can be mentioned, for example, epoxy groups such as γ-glycidoxypropyl group, β-(3,4-epoxycyclohexyl)ethyl group, 5,6-epoxyhexyl group, 9,10-epoxydecyl group and the like; mercapto groups such as γ-mercaptopropyl group, β-(mercaptomethylphenyl)ethyl group, 6-mercaptohexyl group, 10-mercaptodecyl group, mercaptomethyl group and the like; (meth)acryloyl groups such as γ-methacryloxypropyl group, γ-methacryloxymethyl group, y-acryloxypropyl group, γ-acryloxymethyl group and the like; and vinyl group. Of these, mercapto groups are preferred.

The component (F-3) can be produced by subjecting the compound (1-i) and/or (1-ii), the compound (2) and the compound (3) to cocondensation by one of various methods known per se. Specifically, the following methods can be mentioned, but other methods may be used.

(a) A method which comprises subjecting a silane coupling agent [the compound (1-i) and/or (1-ii), silane coupling agent has the same meaning hereinafter], a trifunctional alkylsilane [the compound (2), trifunctional alkylsilane has the same meaning hereinafter] and a tetrafunctional silane [the compound (3), tetrafunctional silane has the same meaning hereinafter] to partial hydrolysis cocondensation in the presence of a hydrolysis condensation catalyst.

(b) A method which comprises subjecting a trifunctional alkylsilane and a tetrafunctional silane to partial cohydrolysis to obtain an oligomer or a resin and then reacting the oligomer or the resin with a silane coupling agent or a hydrolyzate thereof.

(c) A method which comprises subjecting a silane coupling agent and a trifunctional alkylsilane to cohydrolysis and then reacting the hydrolyzate with a tetrafunctional silane or a partial hydrolyzate thereof.

Of the above methods, the method (a) of subjecting a mixture of the raw material silane compounds to partial hydrolysis cocondensation is particularly preferred because the method (a) enables uniform introduction of the organic functional group ($R^1$) and the units derived from the compounds (2) and (3) into the component (F-3) and the coating obtained with the resulting component (F-3) can form a cured film superior in stain resistance, acid resistance, alkali resistance, durability and cracking resistance.

As the silane coupling agent, trifunctional alkylsilane and tetrafunctional silane constituting the component (F-3), there can be used those known per se. The silane coupling agent may be any of a trifunctional compound [compound (1-ii)] and a bifunctional compound [compound (1-i)].

The component (F-3) can be produced in a manner similar to that employed in the production of the component (F-2). That is, the raw materials are as necessary dissolved in the above-mentioned solvent; the above-mentioned hydrolysis catalyst and water are added in the amounts mentioned previously; and partial hydrolysis cocondensation is allowed to take place at a temperature ranging from room temperature to 150° C. or less.

The amount of the component (F-3) in the present coating can be generally 0.1–50 parts by weight, preferably 1.0–20 parts by weight per 100 parts by weight of the total solid content of the component (A) and the component (B).

The cured film formed from the present coating comprising the component (F), when exposed outdoors, reduces its contact angle with water gradually owing to the action of rain, etc. The ultimate contact angle with water, shown by said cured film when exposed outdoors can be beforehand predicted by measuring the contact angle with water of said film after subjecting said film before outdoor exposure to an acid treatment (for example, immersion in a 2.5 wt. % aqueous sulfuric acid solution at 20° C. for 24 hours, removal of adhering aqueous sulfuric acid solution by water washing, and drying).

It is preferable that the cured film formed from the present coating comprising the component (F) can form a cured film showing a contact angle with water, of preferably 10–70 when subjected to an acid treatment (immersion in a 2.5 wt. % aqueous sulfuric acid solution at 20° C. for 24 hours, removal of adhering aqueous sulfuric acid solution by water washing, and drying).

Component (G) Colloidal silica

The coating of the present invention, when comprising colloidal silica, can form a harder cured film, for example, a cured film having a TUKON hardness (20° C.) of 22 or more.

As the colloidal silica used in the present coating, a per se known colloidal silica can be used. Specifically, a dispersion of ultrafine particles of silicon dioxide ($SiO_2$) in an organic solvent is used preferably. The ultrafine particles preferably consist of almost truly spherical silica which has a high molecular weight owing to siloxane bond and may have hydroxyl group on the surface. The ultrafine particles preferably have an average particle diameter of generally 2–100 nm, particularly 5–50 nm. The organic solvent used for dispersing the ultrafine particles can be selected freely. Examples thereof are hydrocarbons such as hexane, heptane, xylene, toluene, cyclohexane and the like; esters such as methyl acetate, ethyl acetate, ethylene glycol monomethyl ether acetate, diethylene glycol monomethyl ether acetate and the like; ethers such as isopropyl ether, ethylene glycol monomethyl ether, diethylene glycol monobutyl ether and the like; alcohols such as ethyl alcohol, butyl alcohol, hexyl alcohol and the like; and ketones such as methyl isobutyl ketone, methyl ethyl ketone, isophorone, acetophenone and the like. The preferable content of the silicon dioxide ultrafine particles in its dispersion in organic solvent is generally 15–50% by weight, particularly 20–43% by weight.

The dispersion of silicon dioxide ultrafine particles in organic solvent, usable in the present coating is commercially available. Examples of commercial dispersions are Snowtex MA-ST-M, Snowtex IPA-ST, Snowtex EG-ST, Snowtex EG-ST-ZL, Snowtex NPC-ST, Snowtex DMAC-ST, Snowtex MEK, Snowtex XBA-ST and Snowtex MIBK-ST (all are products of Nissan Chemical Industries, Ltd.).

In the coating of the present invention, the amount of the component (G) (colloidal silica) used can be selected from a wide range depending upon the properties required for the cured film formed from the present coating, but can be generally 10–140 parts by weight, preferably 15–100 parts by weight, more preferably 20–60 parts by weight per 100 parts by weight of the total solid content of the component (A) and the component (B).

Component (H) Photofunctional cationic polymerization catalyst

The coating of the present invention, when comprising a component (H) in addition to the components (A), (B) and (C), has photocurability. As a result, the film formed from the coating has an anti-sagging property and is improved in sanding operation for removing the dust, seeding, etc adhering thereto. The coating comprising the components (A), (B) and (C), when made into a film and heated for curing, causes sagging at times. This sagging can be prevented by adding the component (H) to the three-component system and irradiating the formed film with a light prior to heating, to give rise to preliminary curing. Further, the above three-component system of (A), (B) and (C) gives a hard cured film and makes difficult the sanding operation for removing the dust and seeding adhering thereto. However, this sanding operation becomes easy and removal of dust and seeding is made easily when the component (H) is added to the three-component system, a film is formed from the resulting coating, and the film is irradiated with a light to give rise to preliminary curing.

As the photofunctional cationic polymerization catalyst (H) used in the present coating for obtaining the above merits, there can be mentioned the following compounds.

(i) Diazonium salts represented by the following general formulas (I) and (II).

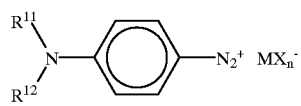
(I)

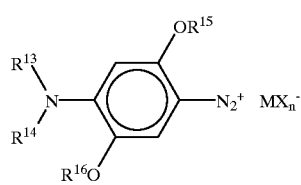
(II)

(ii) Sulfonium salts represented by the following general formulas (III), (IV) and (V).

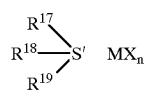
(III)

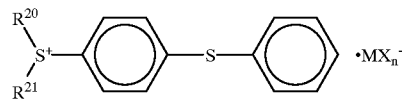
(IV)

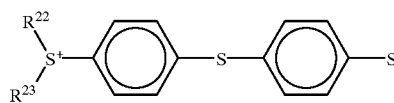
(V)

(iii) Iodonium salts represented by the following general formula (VI).

$$R^{26}\text{—}I^{+}\text{—}R^{27}\cdot MX_n^{-}$$ (VI)

(iv) Metal compounds represented by the following general formulas (VII) and (VIII).

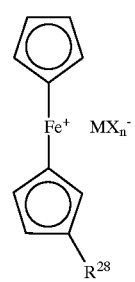
(VII)

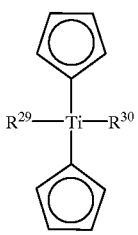
(VIII)

(V) Sulfonium acetones represented by the following general formulas (IX) and (X).

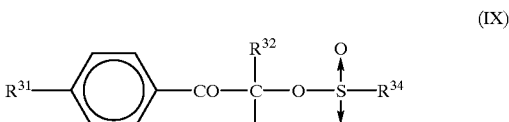
(IX)

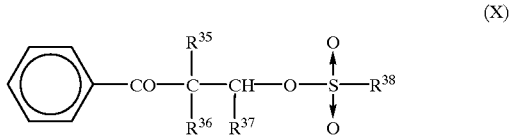
(X)

In the above formulas, $R^{11}$ to $R^{38}$ are each a hydrogen atom, an alkyl group, a phenyl group, an aryl group or a hydroxyalkyl group; and $MX_n$ is $SbF_6$, $AsF_6$, $PF_6$ or $BF_4$.

The amount of the component (H) used can be generally 0.2–200 parts by weight, preferably 0.5–100 parts by weight, more preferably 1–20 parts by weight per 100 parts by weight of the total solid content of the component (A) and the component (B).

As the component (H), there can be also be used, for example, (vi) a silicon compound which generates silanol group when irradiated with a light and (vii) an aluminum complex.

As the silicon compound (vi), there can be preferably used a silicon compound having any of peroxysilane group, o-nitrobenzyloxy group and α-ketosilyl group. The silicon compound having peroxysilane group includes a compound represented by the following general formula:

$$(R^{x1})_{ns}\text{—}Si(O\text{—}O\text{—}R^{x2})_{4-ns}$$

wherein $R^{x1}$ and $R^{x2}$ may be the same or different and are each a hydrogen atom, a halogen atom, a $C_{1-5}$ alkyl group, an aryl group or an aralkyl group; and ns is an integer of 0–3.

The $C_{1-5}$ alkyl group includes, for example, methyl group, ethyl group, isopropyl group, n-propyl group, n-butyl group, tert-butyl group, sec-butyl group and n-pentyl group. The aryl group and the aralkyl group include, for example, phenyl group, naphthyl group, anthranyl group and benzyl group. The $C_{1-5}$ alkyl group, the aryl group and the aralkyl group may each have halogen atom, nitro group, cyano group, methoxy group, etc. as substituents.

Specific examples of the silicon compound having peroxysilane group include the followings.

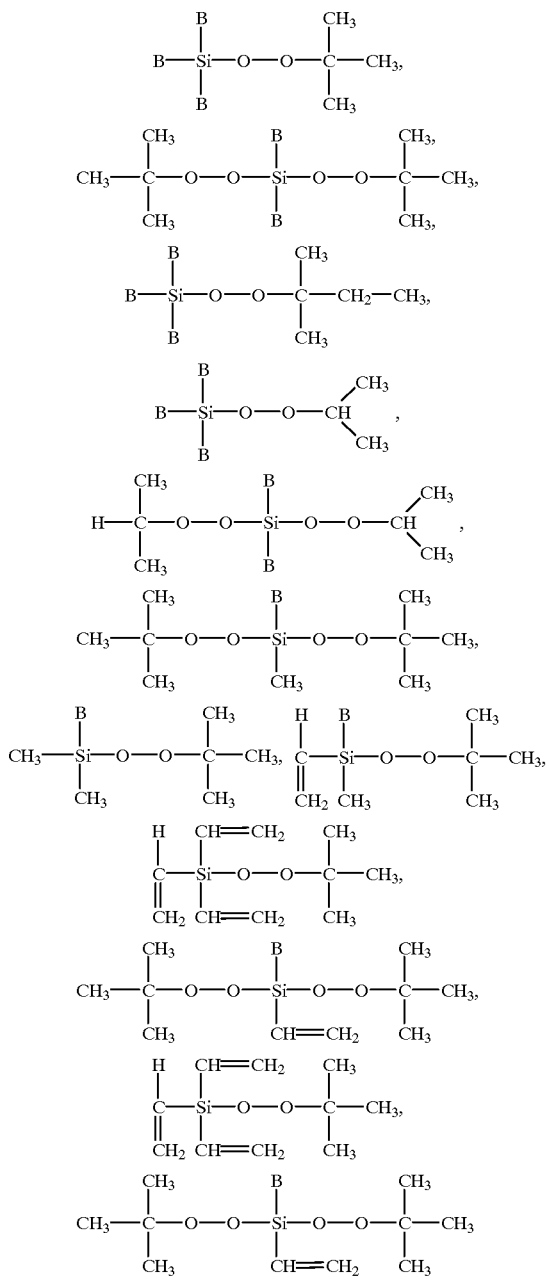

In the above formulas, B refers to a benzene ring.

The silicon compound having o-nitrobenzyloxy group includes a compound represented by the following general formula:

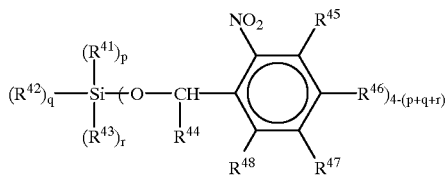

wherein $R^{41}$ to $R^{43}$ may be the same or different and are each a hydrogen atom, a halogen atom, a vinyl group, an allyl group, a $C_{1-10}$ unsubstituted or substituted alkyl group, a $C_{1-10}$ alkoxy group, an unsubstituted or substituted aryl group, an aryloxy group or a siloxy group; $R^{44}$ group is a hydrogen atom, a $C_{1-10}$ unsubstituted or substituted alkyl group, a phenyl group or a substituted phenyl group; $R^{45}$, $R^{46}$, $R^{47}$ and $R^{48}$ may be the same or different and are each a hydrogen atom, a halogen atom, a nitro group, a cyano group, a hydroxyl group, a mercapto group, an acetyl group, an allyl group, a $C_{1-5}$ alkyl group, a $C_{1-5}$ alkoxy group, an unsubstituted or substituted aryl group or an aryloxy group; and p, q and r are each an integer satisfying $0 \leq p, q, r \leq 3$ and $1 \leq p+q+r \leq 3$.

The $C_{1-10}$ unsubstituted or substituted alkyl group includes, for example, methyl group, ethyl group, propyl group, butyl group, tert-butyl group, pentyl group, chloromethyl group, chloroethyl group, fluoromethyl group and cyanomethyl group. The $C_{1-10}$ alkoxy group includes, for example, methoxy group, ethoxy group, n-propoxy group and n-butoxy group. The unsubstituted or substituted aryl group includes, for example, phenyl group, p-methoxyphenyl group and p-chlorophenyl group.

Specific examples of the compound represented by the above formula are p-trifluoromethylphenylvinylmethylphenyl(o-nitrobenzyloxy)silane, tert-butylmethylphenyl(o-nitrobenzyloxy)silane, triethyl(o-nitrobenzyloxy)silane, tri(2-chloroethyl)-o-nitrobenzyloxysilane, tri(p-trifluoromethylphenyl)-o-nitrobenzyloxysilane, trimethyl[α-(o-nitrophenyl)-o-nitrobenzyloxy]silane, dimethylphenyl[α-(o-nitrophenyl)-o-nitrobenzyloxy]silane, methylphenyldi[α-(o-nitrophenyl)-o-nitrobenzyloxy]silane, triphenyl(α-ethyl-o-nitrobenzyloxy)silane, trimethyl(3-methyl-2-nitrobenzyloxy)silane, dimethylphenyl(3,4,5-trimethoxy-2-nitrobenzyloxy)silane, triphenyl(4,5,6-trimethoxy-2-nitrobenzyloxy)silane, diphenylmethyl(5-methyl-4-methoxy-2-nitrobenzyloxy)silane, triphenyl(4,5-dimethyl-2-nitrobenzyloxy)silane, vinylmethylphenyl(4,5-dichloro-2-nitrobenzyloxy)silane, triphenyl(2,6-dinitrobenzyloxy)silane, diphenylmethyl-(2,4-nitrobenzyloxy)silane, triphenyl (3-methoxy-2-nitrobenzyloxy)silane, vinylmethylphenyl(3,4-dimethoxy-2-nitrobenzyloxy)silane, dimethyldi(o-nitrobenzyloxy)silane, methylphenyldi(o-nitrobenzyloxy)silane, vinylphenyldi(o-nitrobenzyloxy)silane, tert-butylphenyl-di(o-nitrobenzyloxy)silane, diethyldi(o-nitrobenzyloxy)silane, 2-chloroethylphenyldi(o-nitrobenzyloxy)silane, diphenyldi(o-nitrobenzyloxy)silane, diphenyldi(3-methoxy-2-nitrobenzyloxy)silane, diphenyldi(3,4-dimethoxy-2-nitrobenzyloxy)silane, diphenyldi(2,6-dinitrobenzyloxy)silane, diphenyldi(2,4-dinitrobenzyloxy)silane, methyltri(o-nitrobenzyloxy)silane, phenyl-tri(o-nitrobenzyloxy)silane, p-bis(o-nitrobenzyloxy-dimethylsilyl)benzene, 1,1,3,3-tetraphenyl-1,3-di(o-nitrobenzyloxy)siloxane, 1,1,3,3,5,5-hexaphenyl-1,5-di(o-nitrobenzyloxy)siloxane, and silicon compounds formed by a reaction of a SiCl-containing silicone resin and o-nitrobenzyl alcohol.

The silicon compound having α-ketosilyl group includes a compound represented by the following general formula:

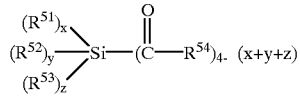

wherein x, y and z are each a number of 0, 1, 2 or 3 and (x+y+z) is not larger than 3; and $R^{51}$, $R^{52}$ $R^{53}$ and $R^{54}$ may be the same or different and are each a hydrocarbon group such as $C_{1-10}$ alkyl group, aryl group, allyl group, vinyl group or the like, an aryloxy group or a $C_{1-10}$ alkoxy group, all of which may have a substituent(s) such as halogen atom, $-NO_2$, $-CN$, $-OCH_3$ or/and the like.

Specific examples of the silicon compound having α-ketosilyl group are as follows.

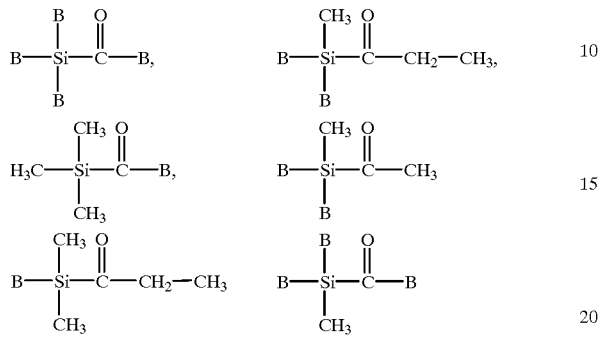

In the above formulas, B refers to a benzene ring.

The amount of the silicon compound used in the present coating can be generally 0.01–20 parts by weight, preferably 0.1–15 parts by weight, more preferably 1–10 parts by weight per 100 parts by weight of the total solid content of the component (A) and the component (B).

Specific examples of the aluminum complex (vii) include the followings: trismethoxyaluminum, trisethoxyaluminum, trisisopropoxyaluminum, trisphenoxyaluminum, trisparamethylphenoxyaluminum, isopropoxydiethoxyaluminum, trispropoxyaluminum, trisacetoxyaluminum, trisstearatoaluminum, trisbutyratoaluminum, trispropionatoaluminum. trisisopropionatoaluminum, trisacetylacetonatoaluminum, tristrifluoroacetylacetonatoaluminum, trishexafluoroacetylacetonatoaluminum, trisethylacetoacetonatoaluminum, trissalicylaldehydatoaluminum, trisdiethylmalonatoaluminum, trispropylacetoacetatoaluminum, trisbutylacetoacetatoaluminum, trisdipivaloylmethanatoaluminum, diacetylacetonatodipivaloylmethanatoaluminum,

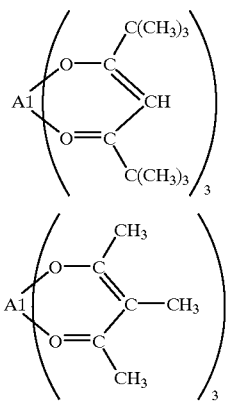

-continued

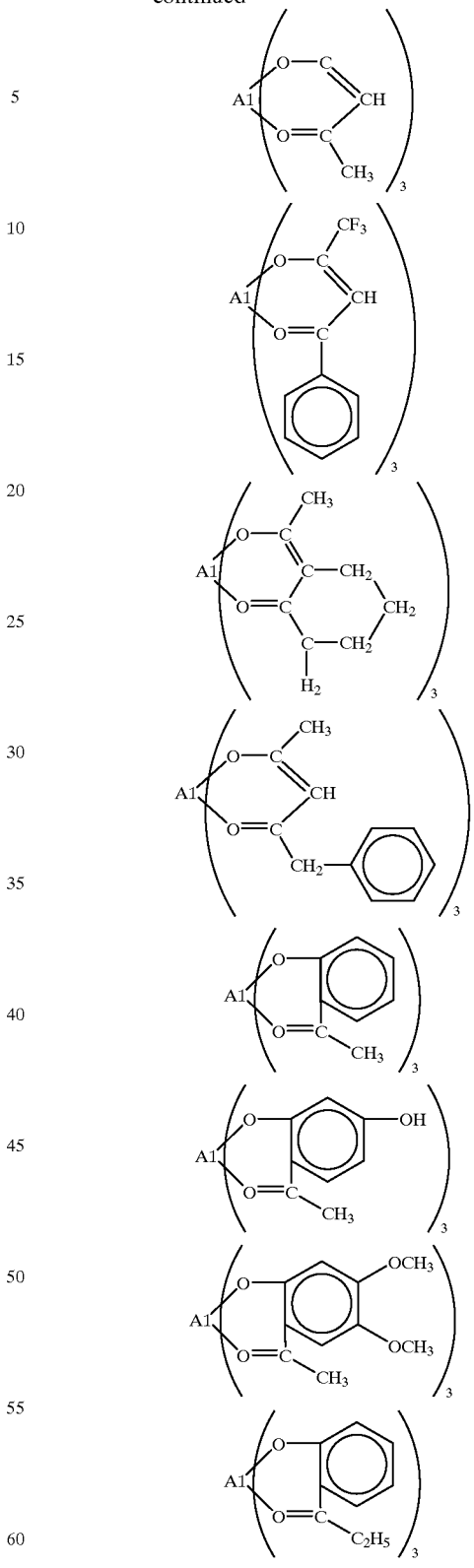

These aluminum complexes can be used singly or in admixture of two or more kinds. The amount of the aluminum complex used in the present coating can be 0.001–20 parts by weight, preferably 0.01–15 parts by weight, more preferably 1–10 parts by weight per 100 parts by weight of the total solid content of the component (A) and the component (B).

There may be used, in place of the aluminum complex, an organic metal compound containing titanium, zirconium or the like, having the same effect.

Modification of the component (B)

(1) By using, as the component (B) of the present coating, an acrylic resin having not only epoxy group but also dialkylsiloxy group, i.e.

(B') an epoxy group- and dialkylsiloxy group-containing acrylic resin having a number-average molecular weight of 2,000–50,000, a hydroxyl value of 10–150 mg KOH/g and an epoxy equivalent of 220 or less, there can be provided a thermosetting organic solvent type coating capable of forming a cured film which maintains water repellency over a long period of time, which is not substantially softened even when subjected to high temperatures of 60° C. or higher, into which staining substances do not infiltrate or stick, which allows easy removal of staining substances adhering thereto by washing with water or wiping with dry cloth without using any detergent, and which is superior in weatherability, finish appearance, acid resistance, etc.

The component (B') can be produced by copolymerizing an epoxy group-containing polymerizable monomer (B'-1), a hydroxyl group-containing polymerizable monomer (B'-2), a dialkylsiloxy group-containing polymerizable monomer (B'-3), a polymerizable acrylic monomer (B'-4) (these four components are essential) and, as necessary, other polymerizable monomer (B'-5).

As the epoxy group-containing polymerizable monomer (B'-1), the hydroxyl group-containing polymerizable monomer (B'-2), the polymerizable acrylic monomer (B'-4) and the other polymerizable monomer (B'-5), there can be used those monomers mentioned with respect to the component (B).

The dialkylsiloxy group-containing polymerizable monomer (B'-3) is a compound having, in the molecule, at least one dialkylsiloxy group and at least one polymerizable unsaturated double bond. The "dialkylsiloxy group" is a group represented by the following general formula:

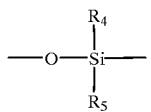

wherein $R_4$ and $R_5$ may be the same or different and are each a $C_{1-5}$ alkyl group such as methyl group, ethyl group, propyl group, butyl group, pentyl group or the like with methyl group or ethyl group being particularly preferred.

The monomer (B'-3) includes, for example, a dialkylsiloxy group-containing (meth)acrylate represented by the following general formula:

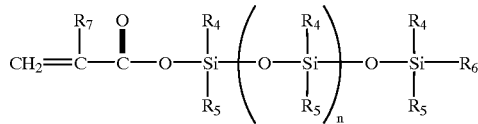

wherein $R_4$, $R_5$ and $R_6$ may be the same or different and are each a $C_{1-5}$ alkyl group with methyl group being preferred; $R_7$ is a hydrogen atom or a methyl group; and n is such a number that the molecular weight of the monomer becomes 1,000–20,000.

The component (B') can be produced, for example, by subjecting the monomers (B'-1), (B'-2), (B'-3), (B'-4) (these are essential monomers) and, as necessary, (B'-5) to solution polymerization using a radical polymerization catalyst according to an ordinary method.

The monomers (B'-1) to (B'-5) are used in such proportions that the component (B') has a hydroxyl value of 10–150 mg KOH/g, preferably 20–120 mg KOH/g and an epoxy equivalent of 220 or less, preferably 100–200. The monomer (B'-3) is used in an amount of preferably 0.1–40% by weight, more preferably 1–30% by weight, particularly preferably 3–20% by weight based on the total weight of the monomers used for production of the component (B').

The component (B') preferably has a number-average molecular weight of 2,000–50,000, particularly 3,000–20,000. When the molecular weight is smaller than 2,000, the resulting coating gives a film of low curability. When the molecular weight is larger than 50,000, the resulting coating tends to give a film of low finish appearance.

In the coating of the present invention, the component (A) and the component (B') can be used in such proportions that the molar ratio of the epoxy groups of the component (A) and the epoxy groups of the component (B') become component (A):component (B')=1:1 to 1:0.05, preferably 1:0.8 to 1:02. (2) By using, as the component (B) of the present coating, an acrylic resin having not only epoxy group but also oxetane functional group, i.e.

(B") an epoxy group- and oxetane functional group-containing acrylic resin having a number-average molecular weight of 2,000–50,000 and a hydroxyl value of 10–150 mg KOH/g, the oxetane functional group being represented by the following general formula (XI):

(wherein $R_1$ is a hydrogen atom, a fluorine atom, a $C_{1-6}$ alkyl group, a $C_{1-6}$ fluoroalkyl group, an allyl group, an aryl group, an aralkyl group, a furyl group or a thienyl group), there can be provided a thermosetting organic solvent type coating capable of forming a cured film which is not substantially softened even when subjected to high temperatures of 60° C. or higher, into which staining substances do not infiltrate or stick, which allows easy removal of staining substances adhering thereto, which has very high long-term stain resistance, and which is superior in weatherability, finish appearance, acid resistance, etc.

In the formula (XI), the "$C_{1-6}$ alkyl group" represented by $R_1$ may be a straight-chain or a branched chain and includes, for example, methyl, ethyl, n-propyl, isopropyl, n-butyl, isobutyl, sec-butyl, tert-butyl and n-hexyl; the "$C_{1-6}$ fluoroalkyl group" is a $C_{1-6}$ alkyl group wherein at least one of the hydrogen atoms is replaced by fluorine atom, and includes, for example, fluoropropyl, fluorobutyl and trifluoropropyl; the "aryl group" includes, for example, phenyl, toluyl and xylyl; and the "aralkyl group" includes, for example, benzyl and phenethyl. Of these groups as $R_1$, particularly preferred are a $C_{1-4}$ alkyl group such as methyl, ethyl or the like.

The oxetane functional group is preferably bonded to the side chain or main chain of an acrylic resin via an oxygen-containing linkage such as ether linkage, ester linkage, urethane linkage or the like, or via a hydrocarbon group containing at least one oxygen-containing linkage mentioned above.

The number of the oxetane functional groups in the component (B") is preferably average about two or more, particularly average about 2–10 per molecule of the component (B"). The number of the epoxy groups in the component (B") is preferably average about 2 or more, particularly average about 2–10 per molecule of the component (B"). The total functional group equivalent of the oxetane functional groups and the epoxy groups in the component (B") is preferably 400 or less, particularly 100–300, more particularly 170–270.

The component (B") can have a number-average molecular weight of 2,000–50,000, particularly about 3,000–20,000.

The "epoxy group" possessed by the component (B") (acrylic resin) is particularly preferably the above-mentioned alicyclic epoxy group or glycidyl (meth)acrylate-derived epoxy group. The epoxy group also includes a spiro type epoxy group formed by an alicyclic hydrocarbon and an oxirane ring, wherein the ring of the alicyclic hydrocarbon and the oxirane ring are connected via a carbon atom.

The component (B") can be produced, for example, by copolymerizing an oxetane functional group-containing polymerizable monomer (B"-1), an epoxy group-containing polymerizable monomer (B"-2), a hydroxyl group-containing polymerizable monomer (B"-3), a polymerizable acrylic monomer (B"-4) (these are essential monomers) and, as necessary, other polymerizable monomer (B"-5).

The oxetane functional group-containing polymerizable monomer (B"-1) is a compound having, in the molecule, oxetane functional group represented by the above formula (XI) and polymerizable unsaturated double bond. Specific examples are unsaturated monomers having a radical-polymerizable unsaturated group at one terminal and an oxetane functional group at other terminal, which are obtained by reacting a 1,3-triol (e.g. trimethylolpropane) with diethyl carbonate to produce a hydroxyl group-containing cyclic carbonate, subjecting the carbonate to decarboxylation to produce 3-ethyl-3-hydroxymethyloxetane having a hydroxyl group at one terminal and an oxetane functional group at other terminal, and reacting the oxetane with an unsaturated monomer containing (a) complementary functional group complementarily reactive with the hydroxyl group of the oxetane but substantially unreactive with the oxetane functional group (examples of the group (a) is isocyanate group and methyl ester group) and (b) radical-polymerizable unsaturated group (e.g. acryloyl group, methacryloyl group or vinyl group). More specific examples of the monomer (B"-1) are 3-methacryloxymethyl-3-ethyloxetane, 3-acryloxymethyl-3-ethyloxetane, equimolar adduct of α,α-dimethyl-m-isopropenylbenzyl isocyanate and 3-ethyl-3-hydroxymethyloxetane, and a compound represented by the following formula.

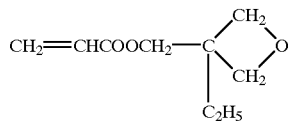

As the epoxy group-containing polymerizable monomer (B"-2), the hydroxyl group-containing polymerizable monomer (B"-3), the polymerizable acrylic monomer(B"-4) and other polymerizable monomer (B"-5), there can be used those monomers mentioned with respect to the component (B).

The component (B") can be produced, for example, by subjecting the monomers (B"-1), (B"-2), (B"-3), (B"-4) (these are essential monomers) and, as necessary, (B"-5) to solution polymerization in the presence of a radical polymerization catalyst according to an ordinary method.

The proportions of the individual monomers used can be determined so that the resulting component (B") has a hydroxyl value of 10–150 mg KOH/g, preferably 20–100 mg KOH/g and a total functional group equivalent of the epoxy groups and the oxetane functional groups, of 400 or less, preferably 100–300, more preferably 170–270. The component (B") preferably has a number-average molecular weight of 2,000–50,000, particularly 3,000–20,000.

In the coating of the present invention, the component (A) and the component (B") can be used in such proportions that the molar ratio of the alicyclic epoxy groups of the component (A) and the total of the epoxy groups and oxetane groups of the component (B") becomes component (A):component (B")=1:1 to 1:0.05, preferably 1:0.8 to 1:0.2. The appropriate total functional group equivalent of the alicyclic epoxy groups of the component (A) and the oxetane functional groups and epoxy groups of the component (B") is generally 300 or less, particularly 100–250, more particularly 120–230 based on the total amount of the component (A) and the component (B").

Production of coating

The thermosetting organic solvent type coating of the present invention can be produced by dissolving or dispersing the component (A), the component (B) or (B'), or (B"), the component (C) and, optionally, the components (D) to (H), all mentioned above, in an organic solvent. As the organic solvent, there can be mentioned, for example, toluene, xylene, ethyl acetate, butyl acetate, methyl ethyl ketone, methyl isobutyl ketone, cyclohexanone, isophorone, methanol, ethanol, butanol, methyl acetate, methoxybutyl acetate, cellosolve and cellosolve acetate; however, the solvent is not restricted to them.

The coating of the present invention can as necessary comprise, in addition to the above components, ordinary additives for coating such as coloring pigment, iridescent pigment, metallic pigment, extender pigment, ultraviolet absorber, light stabilizer, fluidity-controlling agent, anti-cissing agent and the like, depending upon the application purpose, etc.

The coating of the present invention can generally be used as a solid color coating, a metallic coating or a photoiridescent coating. However, being capable of forming a cured film superior in stain resistance, the present coating is most preferably used as a clear coating for forming the uppermost layer transparent film of multilayered coating film.

Hence, the present invention further provides a method for forming a multilayered top coat film by applying, on a material to be coated, at least one kind of coloring coating and at least one kind of clear coating in this order, wherein the above-mentioned thermosetting organic solvent type coating of the present invention (hereinafter referred to as the present coating) is used as the clear coating for forming the uppermost layer film of the multilayered top coat film (this method is hereinafter referred to as the present application method).

The present application method can be specifically carried out, for example, as follows; however, it can also be carried out by other practices.

Application method A

An application method which comprises applying a coloring coating and a clear coating in this order to form a multilayered top coat film, wherein the present coating is used as the clear coating (a 2-coat method).

Application method B

An application method which comprises applying a coloring coating, a first clear coating and a second clear coating in this order to form a multilayered top coat film, wherein the present coating is used as the second clear coating (a 3-coat method).

Application method C

An application method which comprises applying a first coloring coating, a second coloring coating and a clear coating in this order to form a multilayered top coat film, wherein the present coating is used as the clear coating (a 3-coat method).

Description is made in detail on the above application methods.

Application method A

The coloring coating used in the application method A includes a solid color coating, a metallic coating and a photoiridescent coating. As the coloring coating, there can be used a per se known thermosetting coating comprising a resin component, a coloring pigment and a solvent.

The resin component comprises:
- at least one kind of base resin having crosslinkable functional group (e.g. hydroxyl group, epoxy group, carboxyl group or alkoxysilane group), selected from acrylic resin, vinyl resin, polyester resin, alkyd resin, urethane resin, etc., and
- at least one kind of crosslinking agent for crosslinking and curing the base resin, selected from alkyl-etherified melamine resin, urea resin, guanamine resin, blocked or unblocked polyisocyanate compound, epoxy compound, carboxyl group-containing compound, etc.

In the resin component, the content of the base resin is preferably 50–90% by weight, particularly 60–80% by weight and the content of the crosslinking agent is preferably 50-10% by weight, particularly 40-20% by weight, all based on the total weight of the two components.

As the coloring pigment, there can be used a solid color pigment, a metallic pigment, a photoiridescent pigment, etc. depending upon the type of the coating in which the pigment is used. Examples of the coloring pigment are inorganic pigments such as titanium oxide, zinc oxide, carbon black, cadmium red, molybdenum red, chrome yellow, chromium oxide, Prussian blue, cobalt blue and the like; organic pigments such as azo pigment, phthalocyanine pigment, quinacridone pigment, isoindoline pigment, vat type pigment, perylene type pigment and the like; scaly aluminum; mica; metal oxide-coated mica; and mica-like iron oxide. These pigments can be used singly or in combination of two or more kinds.

As the solvent, there can be used an organic solvent and/or water. The organic solvent includes, for example, hydrocarbons such as hexane, heptane, xylene, toluene, cyclohexane and the like; esters such as methyl acetate, ethyl acetate, ethylene glycol monomethyl ether acetate, diethylene glycol monomethyl ether acetate and the like; ethers such as isopropyl ether, ethylene glycol monomethyl ether, diethylene glycol monobutyl ether and the like; alcohols such as ethyl alcohol, butyl alcohol, hexyl alcohol and the like; and ketones such as methyl isobutyl ketone, methyl ethyl ketone, isophorone, acetophenone and the like.

The coloring coating can further comprise, as necessary, ordinary additives for coating, such as extender pigment, ultraviolet absorber, light stabilizer, fluidity-controlling agent, anti-cissing agent and the like.

In the application method A, the coloring coating can be applied directly on a material to be coated, such as metallic or plastic material for automobile, or can be applied on a cured film formed by applying a primer (e.g. cationic electrocoating) on said material to be coated, optionally applying thereon an intermediate coating, and then curing the resulting film(s).

The application method A can be carried out by 2-coat 1-bake (2C1B) or by 2-coat 2-bake (2C2B). Specifically, the method A can be carried out as follows. The coloring coating is applied by airless spraying, air spraying, electrostatic coating or the like in a film thickness of about 10–50 μm, preferably about 15–35 μm as cured; after the resulting film has been heated for crosslinking and curing, at about 100–180° C., preferably about 120–160° C. for about 10–40 minutes or has been allowed to stand at room temperature for several minutes (in this case, no curing takes place), the present coating as clear coating is applied on the resulting cured or uncured film by airless spraying, air spraying, electrostatic coating or the like in a film thickness of about 20–70 μm, preferably about 25–50 μm as cured; and the resulting film is heated for crosslinking and curing, at about 100–180° C., preferably about 120–160° C. for about 10–40 minutes.

Application method B

As the coloring coating used in the application method B, there can be used a coating selected from the solid color coating, metallic coating and photoiridescent coating all mentioned in the application method A. The first clear coating is a coating for formation of a substantially colorless and transparent coating film, and there can be used a coating which is the coloring coating minus the most or all portion of the coloring pigment used therein, or the present coating. As the second clear coating is used the present coating.

The application method B can be carried out by 3-coat 1-bake (3C1B) or by 3-coat 2-bake (3C2B). Specifically, the method B can be carried out as follows. The coloring coating is applied directly on a material to be coated (e.g. metallic or plastic material for automobile) or after a primer (e.g. cationic electro-coating) and, optionally, an intermediate coating have been applied on said material and cured, by airless spraying, air spraying, electrostatic coating or the like in a film thickness of about 10–50 μm, preferably about 15–35 μm as cured; after the resulting film has been heated for crosslinking and curing, at about 100–180° C., preferably about 120–160° C. for about 10–40 minutes or has been allowed to stand at room temperature for several minutes (in this case, no curing takes place), the first clear coating is applied on the resulting cured or uncured film in the same manner in a film thickness of about 10–50 μm, preferably about 15–35 μm as cured; after the resulting film has been heated for crosslinking and curing, at about 100–180° C., preferably about 120–160° C. for about 10–40 minutes or has been allowed to stand at room temperature for several minutes (in this case, no curing takes place), the present coating as second clear coating is applied on the resulting cured or uncured film in the same manner in a film thickness of about 10–50 μm, preferably about 15–35 μm as cured; and the resulting film is heated for crosslinking and curing, at about 100–180° C., preferably about 120–160° C. for about 10–40 minutes.

Application method C

As the first coloring coating used in the application method C, there can be used a coating selected from the solid color coating, metallic coating and photoiridescent coating all mentioned in the application method A.

The second coloring coating is a coating which is applied on the cured or uncured film of the first coloring coating, which comprises a resin component, a coloring pigment and a solvent, and which is capable of forming a transparent color film through which the color tone of the first coloring coating (e.g. solid color tone, metallic tone or photoiridescent tone) can be seen through. As the second coloring coating, there can be used a solid color coating, a metallic coating, a photoiridescent coating or the like all having the above property.

The resin component, coloring pigment and solvent used in the second coloring coating can be selected from those mentioned in the coloring coating of the application method A. The amount of the coloring pigment (e.g. solid color pigment, metallic pigment or photoiridescent pigment) used in the second coloring coating is preferably smaller than in the first coloring coating.

By applying, on the film of the first coloring coating, the second coloring coating to form a transparent color film, the solid color tones, metallic tones, photoiridescent tones, etc. of the two films interact favorably with each other, whereby a multilayered film is obtained which is improved in aesthetic effect as compared with the film formed with the first coloring coating alone.

The application method C can be carried out by 3-coat 1-bake (3C1B) or by 3-coat 2-bake (3O2B) or by 3-coat 3-bake (3C3B). Specifically, the method C can be carried out as follows. The first coloring coating is applied directly on a material to be coated (e.g. metallic or plastic material for automobile) or after a primer (e.g. cationic electrocoating) and, optionally, an intermediate coating have been applied on said material and cured, by airless spraying, air spraying, electrostatic coating or the like in a film thickness of about 10–50 $\mu$m, preferably about 15–35 $\mu$m as cured; after the resulting film has been heated for crosslinking and curing, at about 100–180° C., preferably about 120–160° C. for about 10–40 minutes or has been allowed to stand at room temperature for several minutes (in this case, no curing takes place), the second coloring coating is applied on the cured or uncured film of the first coloring coating in the same manner in a film thickness of about 10–50 $\mu$m, preferably about 15–35 $\mu$m as cured; after the resulting film has been heated for crosslinking and curing, at about 100–180° C., preferably about 120–160° C. for about 10–40 minutes or has been allowed to stand at room temperature for several minutes (in this case, no curing takes place), the present coating as clear coating is applied on the cured or uncured film of the second coloring coating in the same manner in a film thickness of about 10–70 $\mu$m, preferably about 25–50 $\mu$m as cured; and the resulting film is heated for crosslinking and curing, at about 100–180° C., preferably about 120–160° C. for about 10–40 minutes.

In each of the application methods A to C, when the present coating comprises the component (H), i.e. a photofunctional cationic polymerization catalyst, the curing of the film formed from the present coating is preferably conducted by employing both of light application and heating. The curing is conducted, for example, by (i) a procedure of removing the organic solvent remaining in the formed film, applying a light to the solvent-removed film to semicure the film, and heating the semicured film for complete curing or (ii) a procedure of heating the formed film for semicuring, and applying a light to the semicured film for complete curing.

The above two procedures are described specifically.

Procedure (i)

Removal of the organic solvent remaining in the formed film is preferably conducted, for example, by allowing the film to stand at a temperature ranging from room temperature to 100° C. for about 1–30 minutes until the organic solvent content in film becomes 10% by weight or less. The solvent-removed film is not substantially crosslinked. Then, a light is applied to the solvent-removed film to semicure the film. The light application is preferably conducted, for example, by using, as a light source, a low-pressure mercury lamp, a high-pressure mercury lamp, a carbon arc lamp, a xenon lamp, an argon glow discharge tube, a metal halide lamp or the like, and applying a light having a wavelength of 180–700 nm at a dose of generally 500–4,000 mJ/cm$^2$, preferably 700–3,000 mJ/cm$^2$ to cure the solvent-removed film until the gel fraction of film becomes generally 10–60% by weight, particularly 20–50% by weight. After the light application, the semicured film is heated to completely cure the film so that the gel fraction of film becomes 90% by weight or more. The heating is conducted generally at 100–180° C., preferably 120–160° C. for about 10–40 minutes.

Herein, the gel fraction of film is a residue (%) of film when a coating is applied on a tinplate sheet in a film thickness of 30 $\mu$m as dried, the resulting film is irradiated with a light and/or heat-treated under the conditions as specified above, the resulting film is peeled, the peeled film is placed in acetone kept at the refluxing temperature, and extraction is conducted for 4 hours; therefore, the gel fraction of film is a yardstick for knowing the curing degree of a crosslinked and cured film. A gel fraction of 100% indicates complete curing.

Procedure (ii)

Semicuring is preferably conducted by heating the formed film generally at 60–120° C., preferably 80–100° C. for about 10–40 minutes so that the gel fraction of film after heating becomes 10–60% by weight, particularly 20–50% by weight. Complete curing by light application is preferably conducted by using the same light source as mentioned above, and applying a light having a wavelength of 180–700 nm at a dose of generally 500–4,000 mJ/cm$^2$, preferably 700–3,000 mJ/cm$^2$ to cure the semicured film until the gel fraction of film becomes 90% by weight or more.

The thus-formed completely cured film is hard and makes it very difficult to apply a sanding operation thereto in order to obtain improved finish appearance. However, since the curing is conducted in two stages as mentioned above, a coating film allowing easy sanding and having excellent finish appearance can be obtained by conducting sanding when semicured and then conducting complete curing. In the procedure (ii), the energy cost required is small because the heating is conducted for semicuring.

The present invention can provide the following meritorious effects (1) The cured film formed from the present coating, as compared with those formed from organic solvent type coatings comprising, as main components, a hydroxyl group-containing acrylic resin and a melamine resin, is at least equivalent in weatherability, finish appearance, etc. and greatly superior in acid resistance.

(2) The cured film formed from the present coating, as compared with those formed from carboxyl-epoxy type coatings comprising, as main components, a carboxyl group-containing resin and an epoxy group-containing resin, is at least equivalent in acid resistance, weatherability and finish appearance and greatly superior in stain resistance.

(3) The cured film formed from the present coating has a TUKON hardness at 20° C. of 15 or more and the minimum value of dynamic modulus E' at a frequency of 110 Hz in the temperature range of 150–200° C., of 1.0×10$^9$ dyn/cm$^2$ or more. Therefore, the film is not substantially softened even when exposed to high temperatures of 60° C. or more.

(4) The cured film formed from the present coating is super hard. Therefore, the staining substances (e.g. bird droppings, pollen, dead insects and particles in exhaust gas) adhering to said cured film do not substantially infiltrate into the film and can be easily removed by wiping. As a result, there occurs no reduction in luster or distinctness of image gloss, at the places where the staining substances adhered.

(5) The cured film formed from the present coating is super hard. Therefore, iron dust, sand, dirt, etc. do not adhere to or stick in the film.

Therefore, the present coating is very useful as a coating particularly for formation of the uppermost layer of multi-layered film of automobile body.

The present invention is more specifically described below based on Examples and Comparative Examples. Incidentally, part and % are by weight unless otherwise specified.

Preparation of Samples

Component (A)

(A-1) for Example: CEL-2021P (trade name, product of Daicel Chemical Industries, Ltd.)

Epoxy equivalent: 130.
Theoretical molecular weight: 252.
Structural formula:

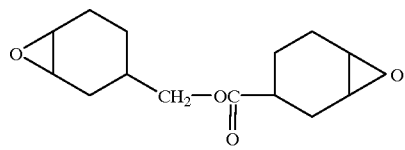

(A-2) for Example: Epolead GT302 (trade name, product of Daicel Chemical Industries, Ltd.)

Epoxy equivalent: 240.
Theoretical molecular weight: 634.
Structural formula:

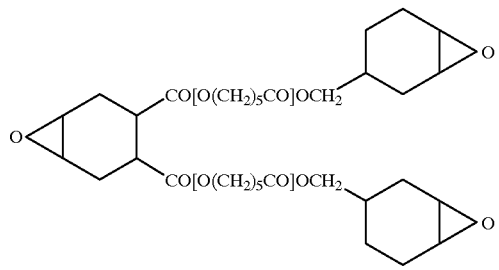

(A-3) for Comparative Example: DENACOL EX-212 (trade name, product of Nagase Chemicals Ltd.)

Epoxy equivalent: 150.
Theoretical molecular weight: 230.
Structural formula:

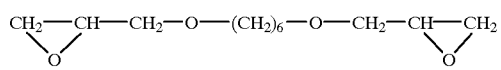

(A-4) for Comparative Example: Celoxide 3000 (trade name, product of Daicel Chemical Industries, Ltd.)

Epoxy equivalent: 93.5 or less.
Theoretical molecular weight: 168.
Structural formula:

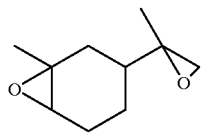

Component (B)

(B-1) for Example: An acrylic resin having an epoxy equivalent of 218, a hydroxyl value of 56 and a number-average molecular weight of 10,000, obtained by subjecting to solution polymerization 650 parts of glycidyl methacrylate, 116 parts of hydroxyethyl acrylate, 100 parts of n-butyl acrylate and 134 parts of n-butyl methacrylate in a manner known per se.

(B-2) for Example: An acrylic resin having an epoxy equivalent of 216, a hydroxyl value of 28 and a number-average molecular weight of 3,000, obtained by subjecting to solution polymerization 850 parts of 3,4-epoxycyclohexylmethyl acrylate, 65 parts of hydroxyethyl methacrylate and 85 parts of n-butyl acrylate in a manner known per se.

(B-3) for Comparative Example: An acrylic resin having an epoxy equivalent of 473, a hydroxyl value of 0 and a number-average molecular weight of 5,000, obtained by subjecting to solution polymerization 300 parts of glycidyl methacrylate, 400 parts of n-butyl acrylate, 200 parts of n-butyl methacrylate and 100 parts of 2-ethylhexyl acrylate in a manner known per se.

Component (C)

(C-1): Sanaid SI-100-L (trade name, product of Sanshin Chemical Industry Co., Ltd., benzyltetramethylenesulfonium hexafluoroantimonate.

(C-2): N-α,α-Dimethylbenzylpyridinium hexafluoroantimonate.

Component (D)

(D-1) for Example: A non-aqueous dispersion obtained by heating a mixture of 95 parts of heptane and 121 parts of a dispersion stabilizer (Note 1) to its reflux temperature, dropwise adding thereto a mixture consisting of 10 parts of 2-perfluorooctylethyl methacrylate, 10 parts of styrene, 25 parts of methyl methacrylate, 30 parts of acrylonitrile, 25 parts of 2-hydroxyethyl methacrylate and 1.5 parts of 2,2'-azobisisobutyronitrile over 3 hours, and then maintaining the resulting mixture at the same temperature for 2 hours; said dispersion having a solid content of 53%, a viscosity (Gardner-Holdt viscosity at 25° C.) of C, an opaque appearance, a particle diameter (electron microscope) of 0.2 to 0.3 μm. The particles/stabilizer ratio was 60/40, and only the particles contained perfluoro groups.

(Note 1) Dispersion stabilizer: A hydroxyl group-containing acrylic resin obtained by dropwise adding, to a solvent consisting of 40 parts of isobutyl acetate and 40 parts of toluene at its reflux temperature, a mixture consisting of 10 parts of styrene, 50 parts of isobutyl methacrylate, 9 parts of butyl acrylate, 10 parts of cyclohexyl methacrylate, 10 parts of 2-ethylhexyl methacrylate, 1 part of methacrylic acid, 10 parts of 2-hydroxyethyl methacrylate and 2 parts of 2,2'-azobisisobutyronitrile over 3 hours and thereafter maintaining the resulting mixture at the same temperature for 2 hours; said acrylic resin having a solid content of 55%, a viscosity (Gardner-Holdt viscosity at 25° C.) of N and a weight average molecular weight of 16,000.

(D-2) for Example: A non-aqueous dispersion obtained by heating a mixture of 93 parts of heptane and 98 parts of a dispersion stabilizer (Note 2) to its reflux temperature, dropwise adding thereto a mixture consisting of 5 parts of 2-perfluorooctylethyl methacrylate, 15 parts of styrene, 28 parts of methyl methacrylate, 34 parts of acrylonitrile, 18 parts of 2-hydroxyethyl methacrylate and 2 parts of 2,2'-azobisisobutyronitrile over 3 hours and thereafter maintaining the resulting mixture at the same temperature for 2 hours; said dispersion having a solid content of 53%, a viscosity (Gardner-Holdt viscosity at 25° C.) of A, an opaque appearance and a particle diameter (electron microscope) of 0.2 to 0.3 μm. The particles/stabilizer ratio was 65/35 and both the stabilizer and the particles contained perfluoro groups.

(Note 2) Dispersion stabilizer: A perfluoro group-containing acrylpolyol resin obtained by dropwise adding, to a solvent consisting of 30 parts of isobutyl acetate and 50 parts of toluene at its reflux temperature, a mixture consisting of 10 parts of styrene, 30 parts of isobutyl methacrylate, 15 parts of 2-perfluorooctylethyl methacrylate, 5 parts of butyl acrylate, 10 parts of cyclohexyl methacrylate, 14 parts of 2-ethylhexyl methacrylate, 1 part of methacrylic acid, 15 parts of 2-hydroxyethyl methacrylate and 6 parts of t-butyl peroxy-2-ethylhexanoate over 3 hours and thereafter maintaining the resulting mixture at the same temperature for 2 hours; said acrylpolyol resin having a solid content of 55%, a viscosity (Gardner-Holdt viscosity at 25° C.) of G and a weight average molecular weight of 6,000.

(D-3) for Example: A non-aqueous dispersion obtained by heating a mixture of 90 parts of heptane and a dispersion stabilizer (Note 3) to its reflux temperature, dropwise adding thereto a mixture consisting of 25 parts of perfluoromethylmethyl methacrylate, 10 parts of styrene, 15 parts of methyl methacrylate, 25 parts of acrylonitrile, 25 parts of 2-hydroxyethyl methacrylate and 2 parts of t-butyl peroxy-2-ethylhexanoate over 3 hours and thereafter maintaining the resulting mixture at the same temperature for 2 hours; said dispersion having a solid content of 53%, a viscosity (Gardner-Holdt viscosity at 25° C.) of C, an opaque appearance and a particle diameter (electron microscope) of 0.18 to 0.25 μm. The particles/stabilizer ratio was 60/40, the stabilizer had double bonds introduced thereinto, and the particles contained perfluoro groups.

(Note 3) Dispersion stabilizer: A product obtained by dropwise adding, to a solvent consisting of 30 parts of isobutyl acetate and 50 parts of toluene at its reflux temperature, a mixture consisting of 10 parts of styrene, 20 parts of butyl methacrylate, 34 parts of isobutyl methacrylate, 5 parts of butyl acrylate, 15 parts of 2-ethylhexyl methacrylate, 1 part of methacrylic acid, 15 parts of 2-hydroxyethyl methacrylate and 2 parts of 2,2'-azobisisobutyronitrile over 3 hours, thereafter maintaining the resulting mixture at the same temperature for 2 hours, then adding to the mixture 0.8 part of glycidyl methacrylate, 0.02 part of 4-t-butylpyrocatechol and 0.1 part of dimethylethanolamine and subjecting the resulting mixture to a reaction for introduction of polymerizable double bond; said product having a solid content of 55%, a viscosity (Gardner-Holdt viscosity at 25° C.) of L, a weight average molecular weight of 16,000 and about 0.6 polymerizable double bond per molecule.

(D-4) for Example: A non-aqueous dispersion obtained by heating a mixture of 93 parts of heptane and 149 parts of a dispersion stabilizer (Note 3) to its reflux temperature, then dropwise adding thereto a mixture consisting of 10 parts of 2-perfluorooctylethyl methacrylate, 10 parts of styrene, 27 parts of methyl methacrylate, 30 parts of acrylonitrile, 15 parts of 2-hydroxyethyl methacrylate, 5 parts of glycidyl methacrylate, 3 parts of acrylic acid and 2 parts of 2,2'-azobisisobutyronitrile over 3 hours and thereafter maintaining the resulting mixture at the same temperature for 2 hours; said non-aqueous dispersion having a solid content of 53%, a viscosity (Gardner-Holdt viscosity at 25° C.) of C, an opaque appearance and a particle diameter (electron microscope) of 0.15 to 0.2 μm. The particles/stabilizer ratio was 55/45, the stabilizer had double bonds introduced thereinto, and the particles had internal cross-linkages and contained perfluoro groups.

(D-5) for Example: A non-aqueous dispersion obtained by heating a mixture of 95 parts of heptane and 121 parts of a dispersion stabilizer (Note 2) to its reflux temperature, then dropwise adding thereto a mixture consisting of 15 parts of styrene, 25 parts of methyl methacrylate, 35 parts of acrylonitrile, 25 parts of 2-hydroxyethyl methacrylate and 1.5 parts of 2,2'-azobis-isobutyronitrile over 3 hours and thereafter maintaining the resulting mixture at the same temperature for 2 hours; said non-aqueous dispersion having a solid content of 53%, a viscosity (Gardner-Holdt viscosity at 25° C.) of A, an opaque appearance and a particle diameter (electron microscope) of 0.2 to 0.3 μm. The particles/stabilizer ratio was 60/40 and the stabilizer contained perfluoro groups.

(D-6) for Example: A non-aqueous dispersion obtained by heating a mixture of 110 parts of heptane and 108 parts of Lumiflon LF200 (trade name, product of Asahi Glass Go., Ltd., a 60% solution of a fluoroolefin resin) to its reflux temperature, then dropwise adding thereto a mixture consisting of 15 parts of styrene, 30 parts of methyl methacrylate, 35 parts of acrylonitrile, 20 parts of 2-hydroxyethyl methacrylate and 2 parts of 2,2'-azobisisobutyronitrile over 3 hours and thereafter maintaining the resulting mixture at the same temperature for 2 hours; said non-aqueous dispersion having a solid content of 52%, a viscosity (Gardner-Holdt viscosity at 25° C.) of B, an opaque appearance and a particle diameter (electron microscope) of 0.15 to 0.2 μm. The particles/stabilizer ratio was 60/40 and the stabilizer contained the perfluoroolefin.

(D-7) for Comparative Example: A non-aqueous dispersion obtained by heating a mixture of 95 parts of heptane and 121 parts of a dispersion stabilizer (Note 1) to its reflux temperature, then dropwise adding thereto a mixture consisting of 10 parts of styrene, 40 parts by methyl methacrylate, 30 parts of acrylonitrile, 20 parts of 2-hydroxyethyl methacrylate and 2 parts of t-butyl peroxy-2-ethylhexanoate over 3 hours and thereafter maintaining the resulting mixture at the same temperature for 2 hours; said non-aqueous dispersion having a solid content of 53%, a viscosity (Gardner-Holdt viscosity at 25° C.) of C, an opaque appearance and a particle diameter (electron microscope) of 0.2 to 0.3 μm. The particles/stabilizer ratio was 60/40 and neither the stabilizer nor the particles contained fluorine.

Component (E)

(E-1): TINUVIN 440 [trade name of Ciba-Geigy Japan Limited, 8-acetyl-3-dodecyl-7,7,9,9-tetramethyl-1,3,8-triazaspiro(4,5)decane-2,4-dione represented by the following formula]:

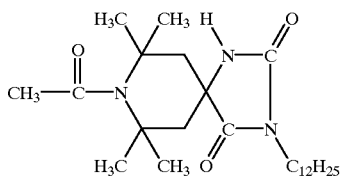

(E-2): Sanduvor 3058 [trade name, product of CLARIANT Co., Ltd., N-acetyl-3-dodecyl-1-1(2,2,6,6-tetramethyl-1,4-piperidinyl)pyrrolidine-2,5-dione represented by the following formula]:

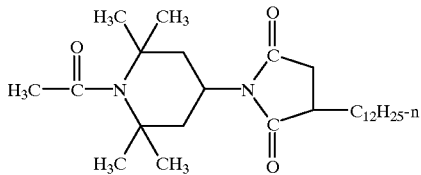

(E-3): TINUVIN 123 [trade name, product of Ciba-Geigy Japan Limited, bis(N-octoxy-2,2,6,6-tetramethyl-4-piperidyl) sebacate represented by the following formula]:

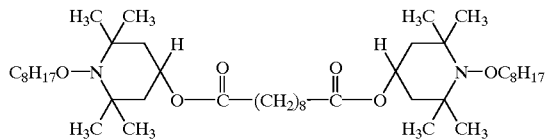

(E-4) for Comparative Example: TINUVIN 292 [trade name of Ciba-Geigy Japan Limited, bis(1,2,2,6,6-pentamethyl-4-piperidyl) sebacate represented by the following formula]:

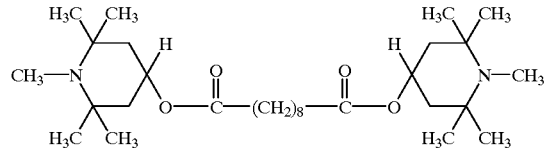

Component (F)
(F-1): A silicon compound having epoxy functional group and alkoxy group, prepared by placing, in a 2,000-ml reactor provided with a thermometer, a nitrogen-introducing tube and a dropping funnel, 236 g (1.00 mole) of γ-glycidoxypropyltrimethoxysilane (b), 152 g (1.00 mole) of tetramethoxysilane, 320 g (10 moles) of methanol and 0.06 g (0.001 mole) of KF, gradually dropping into the resulting mixture 28.8 g (1.60 moles) of water with stirring at room temperature, then stirring the resulting mixture at room temperature for 3 hours, thereafter heating the mixture with stirring under methanol reflux for 2 hours, then subjecting the mixture to distillation under reduced pressure to remove the low-boiling components, and filtering the residue to obtain 266 g of a colorless, transparent liquid.

The product thus obtained was subjected to GPC measurement to find that the average degree of polymerization was 5.3 (the preset degree of polymerization=5.0) and hence was substantially as preset.

The product was subjected to measurement of epoxy equivalent by an epoxy ring-opening method using hydrochloric acid to find that the epoxy equivalent was 319 g/mole (the preset value=314 g/mole), and hence, it was confirmed that the desired amount of epoxy group had been introduced. The amount of alkoxy group was determined by an alkali cracking method to find that it was 36.8% (the preset value=37.4%), and hence, it was confirmed that the alkoxy group remained as preset.

Moreover, from the results of measurement of $^1$H-NMR, the product obtained had a structure represented by the following average compositional formula as preset:

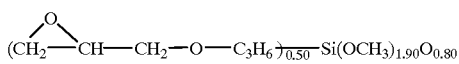

The silicone compound thus obtained is referred to hereinafter as Compound A2-1.

(F-2): Ethyl silicate 40 (trade name, product of Colcoat Co., Ltd., a low condensation product of tetraethoxysilicate having a degree of condensation of 2 to 10).

(F-3): Ethyl silicate 48 (trade name, product of Colcoat Co., Ltd., a low condensation product of tetraethoxysilicate having a degree of condensation of 2 to 10).

Component (G)
(G-1): Snowtex XBA-ST [trade name, product of Nissan Chemical Industries, Ltd., a dispersion of colloidal silica having a high molecular weight owing to siloxane bond, in an organic solvent (xylene/butanol)]; the silica particles have hydroxyl group on the surfaces, a truly spherical shape and particle diameters of 10 to 20 nm; and the dispersion has a solid content of 30%.

Component (H)
(H-1): UVI-6974 (trade name, product of Union Carbide Corporation, a mixture of two sulfonium salts represented by the following formulas):

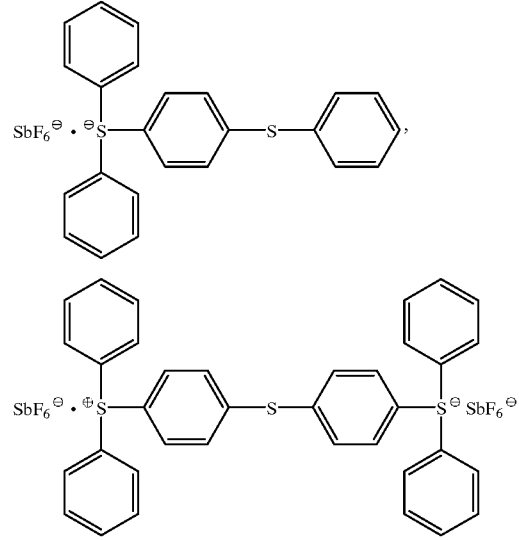

(H-2): Trisacetylacetonatoaluminum
(H-3): Triphenyl(o-nitrobenzyloxy)silane

Component (B')
(B'-1) for Example: An acrylic resin having an epoxy equivalent of 218, a hydroxyl value of 56 and a number-average molecular weight of 10,000, obtained by subjecting to solution polymerization 650 parts of glycidyl methacrylate, 116 parts of hydroxyethyl acrylate, 100 parts of dimethylsiloxy acrylate (Note 4) and 134 parts of n-butyl methacrylate in a manner known per se.

(Note 4)

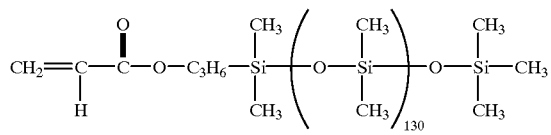

(B'-2) for Example: An acrylic resin having an epoxy equivalent of 216, a hydroxyl value of 28 and a number-average molecular weight of 3,000, obtained by subjecting to solution polymerization 850 parts of 3,4-epoxycyclohexylmethyl acrylate, 50 parts of dimethylsiloxy methacrylate (Note 5), 65 parts of hydroxyethyl methacrylate and 35 parts of n-butyl acrylate in a manner known per se.

(Note 5)

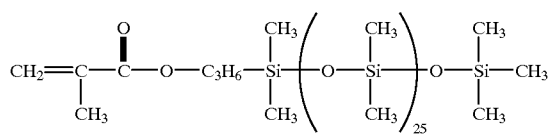

(B'-3) for Comparative Example: An acrylic resin having neither hydroxyl group nor dialkylsiloxy group and having an epoxy equivalent 473, a hydroxyl value of 0 and a number-average molecular weight of 5,000, obtained by subjecting to solution polymerization 300 parts of glycidyl methacrylate, 400 parts of n-butyl acrylate, 200 parts of n-butyl methacrylate and 100 parts of 2-ethylhexyl acrylate in a manner known per se.

Component (B")

(B"-1) for Example: An acrylic resin having an (epoxy+ oxetane) equivalent of 200, a hydroxyl value of 56 and a number average molecular weight of 5,000, obtained by subjecting to solution polymerization 426 parts of glycidyl methacrylate, 368 parts of 3-methacryloxymethyl-3-ethyloxetane, 116 parts of hydroxylethyl acrylate, 50 parts of n-butyl acrylate and 40 parts of n-butyl methacrylate in a manner known per se.

(B"-2) for Example: An acrylic resin having an (epoxy+ oxetane) equivalent of 250, a hydroxyl value of 28 and a number-average molecular weight of 5,000, obtained by subjecting to solution polymerization 196 parts of 3,4-epoxycyclohexyl methacrylate, 510 parts of 3-acryloxymethyl-3-ethyloxetane, 58 parts of hydroxylethyl acrylate, 100 parts of n-butyl acrylate and 136 parts of n-butyl methacrylate in a manner known per se.

(B"-3) for Example: An acrylic resin having an (epoxy+ oxetane) equivalent of 250, a hydroxyl value of 56 and a number-average molecular weight of 5,000, obtained by subjecting to solution polymerization 455 parts of 3,4-epoxycyclohexyl acrylate, 276 parts of 3-methacryloxymethyl-3-ethyloxetane, 116 parts of hydroxylethyl acrylate, 53 parts of n-butyl acrylate and 100 parts of n-butyl methacrylate in a manner known per se.

(B"-4) for Comparative Example: An acrylic resin having an epoxy equivalent of 473, a hydroxyl value of 0 and a number-average molecular weight of 5,000, obtained by subjecting to solution polymerization 300 parts of glycidyl methacrylate, 400 parts of n-butyl acrylate, 200 parts of n-butyl methacrylate and 100 parts of 2-ethylhexyl acrylate in a manner known per se.

EXAMPLES 1 to 3

The components (A), (B) and (C) prepared above were mixed to prepare a coating composition. The proportions of the components used are shown in Table 1.

EXAMPLE 4

The present Example is an example employing 2C1B. The same performance tests as mentioned above were conducted using a coated panel for testing obtained by applying an acrylic resin/melamine resin-based organic solvent type metallic coating (cured film thickness: 20 μm) to a material to be coated obtained by applying to a metal panel a cationic electrocoating and an intermediate coating and then heat-curing them; thereafter applying thereto, without curing, the coating composition obtained in Example 1 (clear coating) (cured film thickness: 40 μm); then heating the resulting assembly at 140° C. for 30 minutes to cure the two coatings applied above. The results obtained are shown in Table 1.

EXAMPLE 5

The same procedure as in Example 1 was repeated, except that the 3C2B in Example 1 was changed to 3-coat 1-bake. The performance test results obtained are shown in Table 1.

EXAMPLE 6

The same procedure as in Example 1 was repeated, except that the 0.5 part of the component (C-1) in Example 1 was replaced by 0.5 part of the component (C-2). The performance test results obtained are shown in Table 1.

TABLE 1

| | Examples | | | | | |
|---|---|---|---|---|---|---|
| | 1 | 2 | 3 | 4 | 5 | 6 |
| (A-1) | 70 | | 50 | 70 | 70 | 70 |
| (A-2) | | 60 | | | | |
| (B-1) | 30 | 40 | | 30 | 30 | 30 |
| (B-2) | | | 50 | | | |
| (C-1) | 0.5 | 1 | 0.5 | 0.5 | 0.5 | 0.5 |
| (C-2) | | | | | | 0.5 |
| Average epoxy equivalent | 156 | 231 | 173 | 156 | 156 | 156 |
| B/A molar ratio | 0.26 | 0.73 | 0.60 | 0.26 | 0.26 | 0.26 |
| Modaflow | 0.2 | 0.2 | 0.2 | 0.2 | 0.2 | 0.2 |
| Application steps | 3C2B | 3C2B | 3C2B | 2C1B | 3C1B | 3C2B |
| Finish appearance | ◯ | ◯ | ◯ | ◯ | ◯ | ◯ |
| Hardness 20° C. | 20 | 17 | 18 | 18 | 19 | 21 |
| 60° C. | 12 | 10 | 13 | 10 | 10 | 13 |
| Acid resistance | ◯ | ◯ | ◯ | ◯ | ◯ | ◯ |

TABLE 1-continued

| | Examples | | | | | |
|---|---|---|---|---|---|---|
| | 1 | 2 | 3 | 4 | 5 | 6 |
| Stain removability | ◯ | ◯ | ◯ | ◯ | ◯ | ◯ |
| Resistance to bird droppings | ◯ | ◯ | ◯ | ◯ | ◯ | ◯ |
| Resistance to pollen | ◯ | ◯ | ◯ | ◯ | ◯ | ◯ |
| Minimum modulus | $3.0 \times 10^9$ | $1.8 \times 10^9$ | $2.3 \times 10^9$ | $3.0 \times 10^9$ | $3.0 \times 10^9$ | $3.0 \times 10^9$ |

In Table 1, the following should be noted:

1) The amount of each component mixed is in terms of solid content.
2) "Average epoxy equivalent" is as defined hereinbefore.
3) "B/A molar ratio" means moles of the epoxy group of the component (B) per mole of the epoxy group of the component (A).
4) The term "Modaflow" is a trade name of a surface conditioner produced by MONSANTO COMPANY.
5) The term "3C2B" in the "Application steps" row is an abbreviation for 3-coat 2-bake. Specifically, to a material to be coated obtained by applying to a metal panel a cationic electrocoating and an intermediate coating and heat-curing them were applied an acrylic resin/melamine resin-based organic solvent type metallic coating (cured film thickness: 20 μm) and an acrylic resin/melamine resin-based organic solvent type first clear coating (cured film thickness: 25 μm) in this order, followed by heating at 140° C. for 30 minutes to cure the two films formed; thereafter, the coating obtained in each of Examples 1 to 3 was applied thereto as a second clear coating so that the cured film thickness became 25 μm: and the resulting panel was heated at 140° C. for 30 minutes to obtain a coated panel for testing. Using this coated panel for testing, the following tests were conducted.

Tests for all test items other than minimum elastic modulus were conducted using the coated panel for testing obtained above by 3C2B. Minimum elastic modulus was tested using a single-film panel obtained by applying the coating composition of one of Examples 1–6 to a tinplate sheet in a film thickness of 40 μm as cured and then heating the resulting material at 140° C. for 30 minutes. Measurement was made for the film peeled from the tinplate sheet.

6) "Finish appearance" is a result of visual evaluation. ◯ means that luster, smoothness and the like were good; Δ means that luster, smoothness and the like were considerably inferior; and X means that luster, smoothness and the like were remarkably inferior.
7) "Hardness" is a result obtained by heating the coated panel for testing at 20° C. or 60° C. and measuring the TUKON hardness of the film at each of these film temperatures.
8) "Acid resistance" is a result obtained by dropping 0.4 cc of a 40% aqueous sulfuric acid solution on the coated panel for testing, heating the coated panel at 60° C. for 15 minutes in a hot-air dryer, then washing the panel with water and subjecting the panel to visual evaluation. ◯ means that no change was found; Δ means that spot remained slightly; and X means that stain, whitening or blister was remarkable.
9) "Stain removability" is a result obtained by spraying the coated panel for testing with a test solution prepared by adding sulfuric acid to a mixture of 0.25 part of carbon black (testing dust No. 12 manufactured by Nippon Funtai Kogyo Gijutsu Kyokai) and 99.75 parts of deionized water to adjust the pH to 3.0, allowing the sprayed coated panel to stand in an atmosphere of a temperature of 20° C. and a humidity of 70% for 17 hours, thereafter heating the same in a hot-air dryer at 80° C. for 6 hours, repeating this cycle 4 times, water-washing the film surface of the panel using a sponge, and visually examining the resulting film surface. ◯ means that no stain was found, Δ means that stain was slightly found, and X means that stain was remarkably found.
10) "Resistance to bird droppings" is a result obtained by dropping, on the coated panel for testing, 0.4 cc of a test solution (which was a filtrate obtained by mixing pigeon droppings gathered in the fields, with deionized water so that the concentration became 30%, stirring the mixture using Disper for 30 minutes and then filtering the mixture through a gauze), heating the panel in a gradient oven at 70° C. for 30 minutes, then washing the panel with water, and visually examining the film surface of the panel. ◯ means that no stain was found at all; Δ means that stain, haze and blister were found slightly and X means that stain, haze and blister were found remarkably.
11) "Resistance to pollen" is a result obtained by dropping, on the coated panel for testing, 0.4 cc of a 0.5% solution of cryptomeria pollen (gathered in the fields) in deionized water, heating the panel in a gradient oven at 65° C. for 30 minutes, then washing the panel with water, and visually examining the film surface of the panel. ◯ means that no stain was found at all; Δ means that stain, blister and shrinkage were found slightly; and X means that stain, shrinkage and blister were found remarkably.
12) "Minimum elastic modulus" is the minimum value of dynamic elastic modulus at 150–200° C. (dyn/cm$^2$).

COMPARATIVE EXAMPLES 1 to 6

Coating compositions were prepared using the components for Comparative Examples and components for Examples, prepared in the above Preparation of Samples. The proportions of the components used are shown in Table 2. In Table 2, the proportion of each component used, the average epoxy equivalent, the B/A molar ratio, the application steps, the minimum elastic modulus, the various test methods and evaluation criterions have the same meanings as in Table 1.

TABLE 2

|  | Comparative Examples | | | | | |
|---|---|---|---|---|---|---|
|  | 1 | 2 | 3 | 4 | 5 | 6 |
| (A-1) | 50 | 30 | 60 | 30 |  |  |
| (A-3) |  |  |  |  | 70 |  |
| (A-4) |  |  |  |  |  | 40 |
| (B-1) | 50 | 70 | — | — | 30 | 60 |
| (B-3) |  |  | 40 | 70 |  |  |
| (C-1) |  |  | 0.5 | 0.5 | 0.5 | 0.5 |
| (C-2) |  | 0.5 |  |  |  |  |
| Average epoxy equivalent | 174 | 192 | 267 | 372 | 170 | 168 |
| B/A molar ratio | 0.60 | 1.39 | 0.18 | 0.63 | 0.3 | 0.64 |
| Modaflow | 0.2 | 0.2 | 0.2 | 0.2 | 0.2 | 0.2 |
| Application steps | 3C2B | 3C2B | 3C2B | 3C2B | 3C2B | 3C2B |
| Finish appearance | ○ | ○ | ○ | ○ | ○ | ○ |
| Hardness  20° C. | 10 | 13 | 17 | 10 | 8 | 14 |
| 60° C. | 2 | 4 | 4 | 2 | 2 | 3 |
| Acid resistance | X | Δ | Δ | Δ | Δ | ○ |
| Stain removability | X | X | Δ | Δ | X | Δ |
| Resistance to bird droppings | X | X | X | X | X | X |
| Resistance to pollen | Δ | X | Δ | X | X | X |
| Minimum modulus | $6.1 \times 10^7$ | $3.2 \times 10^8$ | $4.8 \times 10^8$ | $3.8 \times 10^8$ | $9.2 \times 10^7$ | $2.8 \times 10^8$ |

COMPARATIVE EXAMPLE 7

The same procedure as in Example 1 was repeated, except that the following carboxyl-epoxy type clear coating was substituted for the coating obtained in Example 1 and used as the second clear coating of 3C2B in Example 1. The performance test results are shown in Table 3.

Clear coating (carboxyl-epoxy type):

A 50% solution in xylene of a polymer composed of 200 parts of a half-esterification product of maleic acid with ethanol, 50 parts of acrylic acid, 200 parts of n-butyl acrylate, 350 parts of n-butyl methacrylate and 200 parts of styrene (a carboxylic group-containing acrylic resin having a number-average molecular weight of 6,000) was mixed with a 50% solution in xylene of a polymer composed of 350 parts of glycidyl methacrylate, 130 parts of hydroxyethyl methacrylate, 300 parts of n-butyl acrylate, 120 parts of n-butyl methacrylate and 100 parts of styrene (an epoxy group-containing acrylic resin having a number-average molecular weight of 10,000) so that the carboxylic group-containing acrylic resin/the epoxy group-containing acrylic resin ratio became 60/40 in terms of the solid content ratio; and then tetraethylammonium bromide was added thereto in a proportion of 0.5 part per 100 parts of the resin solid content.

COMPARITIVE EXAMPLE 8

The same procedure as in Example 1 was repeated, except that the coating obtained in Example 1 and used as the second clear coating of 3C2B in Example 1 was replaced by the following hydroxyl group-containing acrylic resin/melamine resin-based clear coating. The performance test results obtained are shown in Table 3.

Clear coating (hydroxyl group-containing acrylic resin/melamine resin-based clear coating):

A 50% solution in xylene of a polymer (hydroxyl group-containing acrylic resin having a number average molecular weight of 5,000) composed of 200 parts of styrene, 200 parts of hydroxylethyl methacrylate, 200 parts of n-butyl acrylate, 300 parts of n-butyl methacrylate and 100 parts of 2-ethylhexyl acrylate was mixed with a melamine resin (U-Van 20SE-60, product of Mitsui Toatsu Chemicals, Inc., a butyl etherified melamine resin) so that the hydroxyl group-containing acrylic resin/melamine resin ratio became 60/40 in terms of the solid content ratio.

TABLE 3

|  | Comparative Examples | |
|---|---|---|
|  | 7 | 8 |
| Application steps | 3C2B | 3C2B |
| Finish appearance | ○ | ○ |
| Hardness  20° C. | 10 | 9 |
| 60° C. | 2 | 2 |
| Acid resistance | ○ | X |
| Stain removability | Δ | X |
| Resistance to bird droppings | X | X |
| Resistance to pollen | X | X |
| Minimum modulus | $1.2 \times 10^8$ | $4.0 \times 10^8$ |

EXAMPLES 7 TO 9 AND COMPARATIVE EXAMPLES 9 TO 11

Clear coatings were prepared by mixing the components (A), (B) and (C) prepared in the above Preparation of Sample. The proportions of the components used are shown in Tables 4 and 5. The clear coatings a to c in Table 4 are for the Examples and are the same as used in Examples 1, 3 and 4, and the clear coatings d to f in Table 5 are for the Comparative Examples and are the same as used in Comparative Examples 1, 3 and 5.

A material to be coated obtained by applying a cationic electrocoating and an intermediate coating to a metal panel (having a size of 150×100×0.8 mm) and heat-curing the applied coatings was spray-coated with an acrylic resin/melamine resin-based organic solvent type metallic coating in a film thickness of 20 μm as cured; the resulting material was allowed to stand at room temperature for 3 minutes; on the uncured film formed was spray-coated an acrylic resin/melamine resin-based organic solvent type transparent, colored coating in a film thickness of 20 μm as cured; and the resulting material was allowed to stand at room temperature for 3 minutes and then heated at 140° C. for 30 minutes to cure the two films formed above. Subsequently, the film surface was spray-coated with each of the above clear coatings a to f in a film thickness of 40 μm as cured, and the resulting material was allowed to stand at room temperature for 3 minutes and then heated at 140° C. for 30 minutes to cure the film formed.

These application steps and the results of the coating film performance tests conducted for the coated panels obtained above are shown in Tables 4 and 5.

Incidentally, each item in Tables 4 and 5 has the same meaning as in Table 1.

TABLE 4

|  | Examples | | |
|---|---|---|---|
|  | 7 | 8 | 9 |
| Clear coating | a | b | c |
| (A-1) | 70 | 50 | 70 |
| (B-1) | 30 |  | 30 |
| (B-2) |  | 50 |  |
| (C-1) | 0.5 | 0.5 | 0.5 |
| Average epoxy equivalent | 156 | 173 | 156 |
| B/A molar ratio | 0.26 | 0.60 | 0.26 |
| Modaflow | 0.2 | 0.2 | 0.2 |
| Finish appearance | ○ | ○ | ○ |
| Hardness 20° C. | 21 | 17 | 20 |
| 60° C. | 13 | 12 | 12 |
| Acid resistance | ○ | ○ | ○ |
| Stain removability | ○ | ○ | ○ |
| Resistance to bird droppings | ○ | ○ | ○ |
| Resistance to pollen | ○ | ○ | ○ |
| Minimum modulus | $3.1 \times 10^9$ | $2.4 \times 10^9$ | $2.9 \times 10^9$ |

TABLE 5

|  | Comparative Examples | | |
|---|---|---|---|
|  | 9 | 10 | 11 |
| Clear coating | d | e | f |
| (A-1) | 50 | 60 |  |
| (A-3) |  |  | 70 |
| (B-1) | 50 |  | 30 |
| (B-3) |  | 40 |  |
| (C-1) | — | 0.5 | 0.5 |
| Average epoxy equivalent | 174 | 267 | 170 |
| B/A molar ratio | 0.60 | 0.18 | 0.3 |
| Modaflow | 0.2 | 0.2 | 0.2 |
| Finish appearance | ○ | ○ | ○ |
| Hardness 20° C. | 9 | 16 | 9 |
| 60° C. | 2 | 3 | 2 |
| Acid resistance | X | Δ | Δ |
| Stain removability | X | Δ | X |
| Resistance to bird droppings | X | X | X |
| Resistance to pollen | Δ | Δ | X |
| Minimum modulus | $6.0 \times 10^7$ | $4.9 \times 10^8$ | $9.1 \times 10^7$ |

COMPARATIVE EXAMPLE 12

The same procedure as in Example 7 was repeated, except that the clear coating a used in Example 7 was replaced by the same carboxyl-epoxy type clear coating as used in Comparative Example 7. The performance test results obtained are shown in Table 6.

COMPARATIVE EXAMPLE 13

The same procedure as in Example 7 was repeated, except that the clear coating a used in Example 7 was replaced by the same hydroxyl group-containing acrylic resin/melamine resin-based clear coating as used in Comparative Example 8. The performance test results obtained are shown in Table 6.

TABLE 6

|  | Comparative Examples | |
|---|---|---|
|  | 12 | 13 |
| Finish appearance | ○ | ○ |
| Hardness 20° C. | 9 | 10 |
| 60° C. | 2 | 2 |
| Acid resistance | ○ | X |
| Stain removability | Δ | X |
| Resistance to bird droppings | X | X |
| Resistance to pollen | X | X |
| Minimum modulus | $1.3 \times 10^8$ | $4.2 \times 10^9$ |

EXAMPLES 10 TO 19 AND COMPARATIVE EXAMPLES 14 TO 21

Coating compositions were prepared by mixing the components (A), (B), (C) and (D) prepared above. The proportions of the components used are shown in Tables 7 and 8.

TABLE 7

|  | Examples | | | | |
|---|---|---|---|---|---|
|  | 10 | 11 | 12 | 13 | 14 |
| (A-1) | 70 | 70 | 70 | 70 | 70 |
| (B-1) | 30 | 30 | 30 | 30 | 30 |
| (C-1) | 0.5 | 0.5 | 0.5 | 0.5 | 0.5 |
| (D-1) | 5 |  |  |  |  |
| (D-2) |  | 5 |  |  |  |
| (D-3) |  |  | 5 |  |  |
| (D-4) |  |  |  | 5 |  |
| (D-5) |  |  |  |  | 5 |

TABLE 7-continued

|  | | | | | |
|---|---|---|---|---|---|
| Average epoxy equivalent | 156 | 156 | 156 | 156 | 156 |
| B/A molar ratio | 0.26 | 0.26 | 0.26 | 0.26 | 0.26 |
| Modaflow | 0.2 | 0.2 | 0.2 | 0.2 | 0.2 |
| Finish appearance | ◯ | ◯ | ◯ | ◯ | ◯ |
| Hardness 20° C. | 19 | 20 | 19 | 19 | 19 |
| 60° C. | 12 | 12 | 11 | 12 | 12 |
| Acid resistance | ◯ | ◯ | ◯ | ◯ | ◯ |
| Resistance to bird droppings | ◯ | ◯ | ◯ | ◯ | ◯ |
| Resistance to pollen | ◯ | ◯ | ◯ | ◯ | ◯ |
| Minimum modulus | $2.4 \times 10^9$ | $2.5 \times 10^9$ | $2.4 \times 10^9$ | $2.4 \times 10^9$ | $2.3 \times 10^9$ |
| Initial water repellency | 115 | 116 | 115 | 113 | 108 |
| Initial oil repellency | 73 | 74 | 72 | 70 | 69 |
| Long-term water repellency | 98 | 97 | 79 | 96 | 93 |
| Long-term Stain removability | ◯ | ◯ | ◯ | ◯ | ◯ |

|  | Examples | | | | |
|---|---|---|---|---|---|
|  | 15 | 16 | 17 | 18 | 19 |
| (A-1) | 70 | 70 |  | 50 | 70 |
| (A-2) |  |  | 60 |  |  |
| (B-1) | 30 | 30 | 40 |  | 30 |
| (B-2) |  |  |  | 50 |  |
| (C-1) | 0.5 | 0.5 | 1 | 0.5 |  |
| (C-2) |  |  |  |  | 0.5 |
| (D-1) |  | 10 | 5 | 5 | 5 |
| (D-6) | 5 |  |  |  |  |
| Average epoxy equivalent | 156 | 156 | 231 | 173 | 156 |
| B/A molar ratio | 0.26 | 0.26 | 0.73 | 0.60 | 0.26 |
| Modaflow | 0.2 | 0.2 | 0.2 | 0.2 | 0.2 |
| Finish appearance | ◯ | ◯ | ◯ | ◯ | ◯ |
| Hardness 20° C. | 19 | 17 | 16 | 17 | 18 |
| 60° C. | 11 | 10 | 10 | 12 | 11 |
| Acid resistance | ◯ | ◯ | ◯ | ◯ | ◯ |
| Resistance to bird droppings | ◯ | ◯ | ◯ | ◯ | ◯ |
| Resistance to pollen | ◯ | ◯ | ◯ | ◯ | ◯ |
| Minimum modulus | $2.3 \times 10^9$ | $2.0 \times 10^9$ | $1.4 \times 10^9$ | $1.9 \times 10^9$ | $2.2 \times 10^9$ |
| Initial water repellency | 104 | 115 | 115 | 114 | 115 |
| Initial oil repellency | 65 | 73 | 72 | 72 | 73 |
| Long-term water repellency | 90 | 99 | 97 | 98 | 97 |
| Long-term Stain removability | ◯ | ◯ | ◯ | ◯ | ◯ |

TABLE 8

|  | Comparative Examples | | | | | | | |
|---|---|---|---|---|---|---|---|---|
|  | 14 | 15 | 16 | 17 | 18 | 19 | 20 | 21 |
| (A-1) | 70 | 70 | 30 |  |  | 60 | 50 | 30 |
| (A-3) |  |  |  | 70 |  |  |  |  |
| (A-4) |  |  |  |  | 40 |  |  |  |
| (B-1) | 30 | 30 | 70 | 30 | 60 |  | 50 |  |
| (B-3) |  |  |  |  |  | 40 |  | 70 |
| (C-1) | 0.5 | 0.5 | 0.5 | 0.5 | 0.5 | 0.5 | — | 0.5 |
| (D-1) | — | — | 5 | 5 | 5 | 5 | 5 | 5 |
| (D-7) | — | 5 | — | — |  |  |  |  |
| Average epoxy equivalent | 156 | 156 | 192 | 170 | 168 | 267 | 174 | 372 |
| B/A molar ratio | 0.26 | 0.26 | 1.39 | 0.3 | 0.64 | 0.18 | 0.60 | 0.63 |
| Modaflow | 0.2 | 0.2 | 0.2 | 0.2 | 0.2 | 0.2 | 0.2 | 0.2 |
| Finish appearance | ◯ | ◯ | ◯ | ◯ | ◯ | ◯ | ◯ | ◯ |
| Hardness 20° C. | 20 | 19 | 12 | 6 | 12 | 16 | 9 | 11 |
| 60° C. | 12 | 11 | 3 | 2 | 3 | 3 | 2 | 3 |
| Acid resistance | ◯ | ◯ | Δ | Δ | ◯ | Δ | X | Δ |
| Resistance to bird droppings | ◯ | ◯ | X | X | X | X | X | X |
| Resistance to pollen | ◯ | ◯ | X | X | X | X | X | X |
| Minimum modulus | $3.0 \times 10^9$ | $2.4 \times 10^9$ | $2.6 \times 10^8$ | $8.8 \times 10^7$ | $2.0 \times 10^8$ | $4.4 \times 10^8$ | $5.5 \times 10^7$ | $2.7 \times 10^8$ |
| Initial water repellency | 82 | 80 | 115 | 114 | 114 | 114 | 115 | 115 |
| Initial oil repellency | 24 | 26 | 72 | 73 | 73 | 72 | 70 | 72 |
| Long-term water repellency | 66 | 65 | 97 | 72 | 90 | 88 | 63 | 75 |
| Long-term Stain removability | Δ | Δ | XX | XX | XX | X | XX | XX |

In Tables 7 and 8, the application steps, the initial water repellency, the initial oil repellency and the long-term water repellency and the long-term stain removability are as described below and the other items have the same meanings as in Table 1.

1) Application (coating) were conducted by 3C2B (3-coat 2-bake) in all cases. Specifically, to a material to be coated obtained by applying to a metal panel a cationic electro-coating and an intermediate coating and heat-curing them were applied an acrylic resin/melamine resin-based organic solvent type metallic coating (cured film thickness: 20 μm) and an acrylic resin/melamine resin-based organic solvent type first clear coating (cured film thickness: 25 μm) in this order; the resulting material was heated at 140° C. for 30 minutes to cure the two films formed; subsequently, thereto was applied each of the coatings obtained in Examples 10 to 19 and Comparative Examples 14 to 21 as the second clear coating in a film thickness of 25 μm as cured; and the resulting material was heated at 140° C. for 30 minutes to obtain coated panels for testing. Using these coated panels for testing, the performance of the film of the panel was tested.

2) Initial water repellency: A result of measuring the water contact angle of the coating film which had been heat-cured at 140° C. for 30 minutes and then allowed to stand at room temperature for 1 hour. Initial water repellency was measured by dropping 0.03 cc of water on the said coating film and measuring a contact angle between said drop and the coating film by means of Contact angle meter CA-X150 (trade name, product of Kyowa Kaimen Kagaku K. K.).

3) Initial oil repellency: A result of measuring the paraffin contact angle of the coating film which had been heat-cured at 140° C. for 30 minutes and then allowed to stand at room temperature for one hour. Initial oil repellency was measured by dropping 0.03 cc of molten paraffin on said coating film and measuring a contact angle between said drop and the coating film by means of Contact angle meter CA-X150 (trade name, product of Kyowa Kaimen Kagaku K. K.).

4) Long-term water repellency: A result of measuring in the same manner as in 2) above the water contact angle of the coating film which had been heat-cured at 140° C. for 30 minutes and exposed to sunshine for 500 hours in a sunshine weatherometer.

5) Long-term stain removability: A test solution was prepared by adding sulfuric acid to a mixture of 0.25 part of carbon black (testing dust No. 12 manufactured by Nippon Funtai Kogyo Gijutsu Kyokai) with 99.75 parts of deionized water to adjust the pH to 3.0. A coated panel for testing was allowed to stand in a horizontal state outdoors (in Hiratsuka City) for one week, and then the coated panel was spray-coated with the test solution and allowed to stand outdoors in a horizontal state for one week. This cycle was repeated for two months. Thereafter, the coated panel was dried at 80° C. for 6 hours and then washed with water using a sponge, after which the film surface of the panel was compared with the initial test panel before test. ○ means that no stain was found at all; Δ means that stain was found slightly; x means that stain was found considerably; and X X means that stain was found remarkably.

COMPARATIVE EXAMPLE 21

The same procedure as in Example 10 was repeated, except that the second clear coating used in Example 10 was replaced by the same carboxyl-epoxy type clear coating as used in Comparative Example 7. The performance test results obtained are shown in Table 9.

COMPARATIVE EXAMPLE 22

The same procedure as in Example 10 was repeated, except that the second clear coating used in Example 10 was replaced by the same hydroxyl group-containing acrylic resin/melamine resin-based clear coating as used in Comparative Example 8. The performance test results obtained are shown in Table 9.

TABLE 9

|  | Comparative Examples | |
| --- | --- | --- |
|  | 21 | 22 |
| Finish appearance | ○ | ○ |
| Hardness 20° C. | 10 | 9 |
| 60° C. | 2 | 2 |
| Acid resistance | ○ | X |
| Resistance to bird droppings | X | X |
| Resistance to pollen | X | X |
| Minimum modulus | $1.2 \times 10^8$ | $4.0 \times 10^9$ |
| Initial water repellency | 83 | 80 |
| Inital oil repellency | 35 | 32 |
| Long-term water repellency | 59 | 62 |
| Long-term Stain removability | XX | XX |

EXAMPLES 20 TO 24 AND COMPARATIVE EXAMPLES 23 and 24

Coating compositions were prepared by mixing the components (A), (B), (C) and (E) prepared above. The proportions of these components used are shown in Table 10.

TABLE 10

|  | Examples | | | | | Comparative Examples | |
| --- | --- | --- | --- | --- | --- | --- | --- |
|  | 20 | 21 | 22 | 23 | 24 | 23 | 24 |
| (A-1) | 50 | 50 |  |  | 50 |  |  |
| (A-2) |  |  | 60 | 60 |  | 60 | 60 |
| (B-1) | 50 |  | 40 | 40 | 50 | 40 | 40 |
| (B-2) |  | 50 |  |  |  |  |  |
| (C-1) | 0.5 | 0.5 | 0.5 | 0.5 | 0.5 | 0.5 | 0.5 |
| (E-1) | 2 | 2 |  |  |  |  |  |
| (E-2) |  |  | 2 | 4 |  |  |  |
| (E-3) |  |  |  |  | 2 |  |  |
| (E-4) |  |  |  |  |  | 2 |  |
| Average epoxy equivalent | 174 | 173 | 231 | 231 | 174 | 231 | 231 |
| B/A molar ratio | 0.60 | 0.60 | 0.73 | 0.73 | 0.60 | 0.73 | 0.73 |
| Modaflow | 0.2 | 0.2 | 0.2 | 0.2 | 0.2 | 0.2 | 0.2 |
| Application steps | 3C2B | 3C2B | 3C2B | 3C2B | 3C2B | 3C2B | 3C2B |
| Finish appearance | ○ | ○ | ○ | ○ | ○ | ○ | ○ |

TABLE 10-continued

|  | | Examples | | | | Comparative Examples | |
|---|---|---|---|---|---|---|---|
|  | | 20 | 21 | 22 | 23 | 24 | 23 | 24 |
| Hardness | 20° C. | 18 | 18 | 17 | 17 | 17 | 11 | 17 |
|  | 60° C. | 12 | 12 | 10 | 9 | 11 | 3 | 11 |
| Minimum modulus | | $2.2 \times 10^9$ | $2.3 \times 10^9$ | $1.7 \times 10^9$ | $1.6 \times 10^9$ | $1.5 \times 10^9$ | $3.0 \times 10^8$ | $1.8 \times 10^9$ |
| Acid resistance | | ○ | ○ | ○ | ○ | ○ | Δ | ○ |
| Resistance to bird droppings | | ○ | ○ | ○ | ○ | ○ | X | ○ |
| Resistance to pollen | | ○ | ○ | ○ | ○ | ○ | X | ○ |
| Long-term Stain removability | | ○ | ○ | ○ | ○ | ○ | X | X (cracked) |

In Table 10, the long-term stain removability is as described below, and the other items have the same meanings as in Table 1.

1) Long-term stain removability: A result obtained by subjecting a test panel to an accelerated weathering test for 200 hours by means of a dew cycle weather meter (manufactured by Suga Test Instruments Co., Ltd.); spray-coating the test panel with a test solution [prepared by adding sulfuric acid to a mixture of 0.25 part of carbon black (testing dust No. 12 manufactured by Nippon Funtai Kogyo Gijutsu Kyokai) and 99.75 parts of deionized water to adjust the pH to 3.0]; then allowing the resulting panel to stand in an atmosphere of a temperature of 20° C. and a humidity of 70% for 17 hours; thereafter heating the panel at 80° C. for 6 hours in a hot-air dryer; repeating the above cycle twice; and washing the film surface of the panel with water using a sponge.

○ means that no stain was found at all and no change appeared on the film surface.

Δ means that stain was found slightly or slight deterioration (such as crack or the like) was found on the film surface.

X means that stain was found remarkably or remarkable deterioration (such as crack or the like) was found on the film surface.

EXAMPLES 25 TO 28

Coating compositions were prepared by mixing the components (A), (B), (C) and (F) prepared in the above Preparation of Samples. The proportions of these components used are shown in Table 11.

COMPARATIVE EXAMPLES 25 AND 26

Coating compositions were prepared by mixing the components for Comparative Examples and components In Table 10, the long-term stain removability is as described below, and the other items have the same meanings as in Table 1.

1) Long-term stain removability: A result obtained by subjecting a test panel to an accelerated weathering test for 200 hours by means of a dew cycle weather meter (manufactured by Suga Test Instruments Co., Ltd.); spray-coating the test panel with a test solution [prepared by adding sulfuric acid to a mixture of 0.25 part of carbon black (testing dust No. 12 manufactured by Nippon Funtai Kogyo Gijutsu Kyokai) and 99.75 parts of deionized water to adjust the pH to 3.0]; then allowing the resulting panel to stand in an atmosphere of a temperature of 20° C. and a humidity of 70% for 17 hours; thereafter heating the panel at 80° C. for 6 hours in a hot-air dryer; repeating the above cycle twice; and washing the film surface of the panel with water using a sponge.

○ means that no stain was found at all and no change appeared on the film surface.

Δ means that stain was found slightly or slight deterioration (such as crack or the like) was found on the film surface.

X means that stain was found remarkably or remarkable deterioration (such as crack or the like) was found on the film surface.

EXAMPLES 25 TO 28

Coating compositions were prepared by mixing the components (A), (B), (C) and (F) prepared in the above Preparation of Samples. The proportions of these components used are shown in Table 11.

COMPARATIVE EXAMPLES 25 AND 26

Coating compositions were prepared by mixing the components for Comparative Examples and components for Examples, prepared in the above Preparation of Samples. The proportions of these components used and the performance test results of the compositions are shown in Table 11.

COMPARATIVE EXAMPLES 27

The same procedure as in Example 25 was repeated, except that the second clear coating used in Example 25 was replaced by the same carboxyl-epoxy type clear coating as used in Comparative Example 7. The performance test results are shown in Table 11.

TABLE 11

|  | Examples | | | | Comparative Examples | | |
|---|---|---|---|---|---|---|---|
|  | 25 | 26 | 2T | 28 | 25 | 26 | 27 |
| (A-1) | 70 | 70 |  | 50 | 70 | 50 |  |
| (A-2) |  |  | 60 |  |  |  |  |
| (B-1) | 30 | 30 | 40 |  | 30 | 50 |  |

TABLE 11-continued

|  | 10 Examples | | | | Comparative Examples | | |
| --- | --- | --- | --- | --- | --- | --- | --- |
|  | 25 | 26 | 27 | 28 | 25 | 26 | 27 |
| (B-2) |  |  |  | 50 |  |  |  |
| (C-1) | 0.5 |  | 0.5 | 0.5 | 0.5 |  |  |
| (C-2) |  | 0.5 |  |  |  |  |  |
| (F-1) | 5 |  |  | 5 |  | 5 |  |
| (F-2) |  | 10 |  |  |  |  |  |
| (F-3) |  |  | 5 |  |  |  |  |
| Average epoxy equivalent | 156 | 156 | 231 | 173 | 156 | 173 |  |
| B/A molar ratio | 0.26 | 0.26 | 0.73 | 0.6 | 0.26 | 0.6 |  |
| Modaflow | 0.2 | 0.2 | 0.2 | 0.2 | 0.2 | 0.2 | 0.2 |
| Application steps | 3C2B | 3C2B | 3C2B | 3C2B | 3C2B | 3C2B | 3C2B |
| Finish appearance | ◯ | ◯ | ◯ | ◯ | ◯ | ◯ | ◯ |
| Hardness 20° C. | 19 | 17 | 17 | 17 | 20 | 9 | 10 |
| 60° C. | 10 | 9 | 9 | 11 | 12 | 2 | 2 |
| Minimum modulus | $2.4 \times 10^9$ | $2.0 \times 10^9$ | $1.5 \times 10^9$ | $1.9 \times 10^9$ | $3.0 \times 10^9$ | $5.0 \times 10^7$ | $1.2 \times 10^8$ |
| Acid resistance | ◯ | ◯ | ◯ | ◯ | ◯ | X | ◯ |
| Stain removability | ◯ | ◯ | ◯ | ◯ | ◯ | X | Δ |
| Resistance to bird droppings | ◯ | ◯ | ◯ | ◯ | ◯ | X | X |
| Resistance to pollen | ◯ | ◯ | ◯ | ◯ | ◯ | Δ | X |
| Water contact angle after Acid treatment (°) | 21 | 19 | 23 |  | 72 | 23 | 68 |
| Initial water contact angle (°) | 89 | 88 | 88 | 89 | 81 | 88 | 88 |
| Appearance after 6-month exposure | ◯ | ◯ | ◯ | ◯ | X | Δ | X |
| Water contact angle after 6-month exposure (°) | 25 | 20 | 22 | 26 | 63 | 22 | 58 |

In Table 11, the water contact angle after acid treatment, the initial contact angle, the outdoor exposure test are as described below and the other items have the same meanings as in Table 1.

1) Water contact angle after acid treatment: A result obtained by immersing a test panel in a 2.5% aqueous sulfuric acid solution at 20° C. for 24 hours, subsequently washing the test panel with water to remove the sulfuric acid solution attaching thereto, drying the washed test panel, thereafter dropping 0.03 cc of deionized water on the film surface of the panel, then allowing the panel to stand at 20° C. for 3 minutes and thereafter subjecting the panel to measurement by use of a contact angle meter, Model DCAA manufactured by Kyowa Chemical Industry Co., Ltd.

2) Initial water contact angle: A result obtained by dropping 0.03 cc of deionized water on the film surface of a test panel before outdoor exposure, allowing the panel to stand at 20° C. for 3 minutes and thereafter subjecting the panel to measurement by use of a contact angle meter, Model DCAA manufactured by Kyowa Chemical Industry Co., Ltd.

3) Outdoor exposure test: A test panel was placed in the Tokyo Factory of Kansai Paint Co., Ltd. at an angle of 30° in the south direction. The test panel was thus exposed for 6 months and then examined for appearance and water contact angle without being subjected to sample conditioning such as water-washing or the like.

The evaluation of appearance (contamination) was made by examining the degree of contamination of the film surface of panel based on the following criterion:

◯: No contamination was found in comparison with the coated panel before test.

Δ: Contamination was found in comparison with the coated panel before test.

X: Contamination was found remarkably in comparison with the coated panel before test.

EXAMPLES 29 TO 32 AND COMPARATIVE EXAMPLES 28 AND 29

Coating compositions were prepared by mixing the components (A), (B), (C) and (G) prepared in the above Preparation of Sample. The proportions of these components used are shown in Table 12.

TABLE 12

|  | Examples | | | | Comparative Examples | |
| --- | --- | --- | --- | --- | --- | --- |
|  | 29 | 30 | 31 | 32 | 28 | 29 |
| (A-1) | 50 | 50 | 60 | 60 | 50 | 60 |
| (B-1) | 50 | 50 | 40 | 40 | 50 | 40 |
| (C-1) | 2 | 2 | 2 | 2 | 2 | 2 |
| (G-1) | 40 | 80 | 40 | 80 | — | — |
| Average epoxy equivalent | 174 | 174 | 231 | 231 | 174 | 231 |
| B/A molar ratio | 0.60 | 0.60 | 0.73 | 0.73 | 0.60 | 0.73 |

TABLE 12-continued

|  | Examples | | | | Comparative Examples | |
| --- | --- | --- | --- | --- | --- | --- |
|  | 29 | 30 | 31 | 32 | 28 | 29 |
| Modaflow | 0.2 | 0.2 | 0.2 | 0.2 | 0.2 | 0.2 |
| Application steps | 3C2B | 3C2B | 3C2B | 3C2B | 3C2B | 3C2B |
| Finish appearance | ◯ | ◯ | ◯ | ◯ | ◯ | ◯ |
| Hardness 20° C. | 24 | 28 | 22 | 26 | 18 | 17 |
| 60° C. | 21 | 23 | 19 | 23 | 12 | 9 |
| Minimum modulus | $2.4 \times 10^9$ | $2.3 \times 10^9$ | $2.1 \times 10^9$ | $2.1 \times 10^9$ | $2.3 \times 10^9$ | $2.0 \times 10^9$ |

In Table 12, each item has the same meaning as in Table 1.

EXAMPLES 33 TO 35

Coating compositions were prepared by mixing the components (A), (B), (C) and (H) prepared in the above Preparation of Samples. The proportions of these components mixed are shown in Table 13.

COMPARATIVE EXAMPLE 30

The same procedure as in Example 33 was repeated, except that the second clear coating used in Example 33 was replaced by the same carboxyl-epoxy type clear coating as used in Comparative Example 7. The performance test results obtained are shown in Table 13.

COMPARATIVE EXAMPLE 31

The same procedure as in Example 33 was repeated, except that the second clear coating used in Example 33 was replaced by the same hydroxyl group-containing acrylic resin/melamine resin-based clear coating as used in Comparative Example 8. The performance test results obtained are shown in Table 13.

1) The term "3C2B" in the "Application steps" row is an abbreviation for 3-coat 2-bake. Specifically, to a material to be coated obtained by applying to a metal panel a cationic electrocoating and an intermediate coating and heat-curing them were applied an acrylic resin/melamine resin-based organic solvent type metallic coating (cured film thickness: 20 μm) and an acrylic resin/melamine resin-based organic solvent type first clear coating (cured film thickness: 25 μm) in this order; the resulting material was heated at 140° C. for 30 minutes to cure the two films formed; thereafter, one of the coatings obtained in Examples 33 to 35 was applied to the material as a second clear coating in a film thickness of 25 μm as cured; the resulting material was then heated at 60° C. for 10 minutes to remove substantially all (95%) of the organic solvent in the film and thereafter irradiated with ultraviolet rays from a high-pressure mercury lamp of 180 W/cm at a dose of 1,000 mJ/cm² to semicure the second clear coating film (gel fraction by acetone extraction: 50%); and then the semicured film was heated at 140° C. for 30 minutes for complete curing, to obtain a coated panel for testing.

EXAMPLES 36 TO 38 AND COMPARATIVE EXAMPLES 32 TO 34

Coating compositions were prepared by mixing the components (A), (B') and (C) prepared in the above Preparation

TABLE 13

|  | Examples | | | Comparative Examples | |
| --- | --- | --- | --- | --- | --- |
|  | 33 | 34 | 35 | 30 | 31 |
| (A-1) | 50 | 50 |  |  |  |
| (A-2) |  |  | 60 |  |  |
| (B-1) | 50 |  | 40 |  |  |
| (B-2) |  | 50 |  |  |  |
| (C-1) | 0.5 | 0.5 |  |  |  |
| (C-2) |  |  | 0.5 |  |  |
| (H-1) |  | 0.5 |  |  |  |
| (H-2) | 0.5 |  | 0.5 |  |  |
| (H-3) | 1 |  | 1 |  |  |
| Average epoxy equivalent | 174 | 173 | 231 |  |  |
| B/A molar ratio | 0.60 | 0.60 | 0.73 |  |  |
| Modaflow | 0.2 | 0.2 | 0.2 | 0.2 | 0.2 |
| Application steps | 3C2B | 3C2B | 3C2B | 3C2B | 3C2B |
| Finish appearance | ◯ | ◯ | ◯ | ◯ | ◯ |
| Hardness 20° C. | 20 | 18 | 18 | 10 | 9 |
| 60° C. | 12 | 11 | 12 | 2 | 2 |
| Acid resistance | ◯ | ◯ | ◯ | ◯ | X |
| Resistance to bird droppings | ◯ | ◯ | ◯ | Δ | X |
| Resistance to pollen | ◯ | ◯ | ◯ | X | X |
| Stain removability | ◯ | ◯ | ◯ | X | X |
| Minimum modulus | $2.2 \times 10^9$ | $2.2 \times 10^9$ | $2.1 \times 10^9$ | $1.2 \times 10^8$ | $4.0 \times 10^9$ |

In Table 13, the application steps are as described below and the other items have the same meanings as in Table 1.

of Samples. The proportions of these components used are shown in Table 14.

TABLE 14

|  |  | Examples | | | Comparative Examples | | |
|---|---|---|---|---|---|---|---|
|  |  | 36 | 37 | 38 | 32 | 33 | 34 |
| Component | (A-1) | 70 | 50 |  | 70 |  |  |
| (A) | (A-2) |  |  | 60 |  |  |  |
|  | (A-3) |  |  |  |  | 70 |  |
|  | (A-4) |  |  |  |  |  | 70 |
| Component | (B'-1) | 30 |  | 40 |  | 30 | 30 |
| (B') | (B'-2) |  | 50 |  |  |  |  |
|  | (B'-3) |  |  |  | 30 |  |  |
| Component | (C-1) | 0.5 |  | 0.5 | 0.5 | 0.5 | 0.5 |
| (C) | (C-2) |  | 1.0 |  |  |  |  |
| Modaflow |  | 0.2 | 0.2 | 0.2 | 0.2 | 0.2 | 0.2 |
| Average epoxy equivalent |  | 156 | 173 | 231 | 267 | 170 | 168 |
| B'/A molar ratio |  | 0.26 | 0.60 | 0.73 | 0.18 | 0.3 | 0.64 |
| Finish appearance |  | ◯ | ◯ | ◯ | ◯ | ◯ | ◯ |
| Hardness | 20° C. | 20 | 18 | 17 | 17 | 8 | 14 |
|  | 60° C. | 12 | 13 | 10 | 4 | 2 | 3 |
| Acid resistance |  | ◯ | ◯ | ◯ | Δ | Δ | ◯ |
| Resistance to bird droppings |  | ◯ | ◯ | ◯ | X | X | X |
| Resistance to pollen |  | ◯ | ◯ | ◯ | X | X | X |
| Minimum modulus |  | $3.0 \times 10^9$ | $2.3 \times 10^9$ | $1.8 \times 10^9$ | $4.8 \times 10^8$ | $9.2 \times 10^7$ | $2.8 \times 10^8$ |
| Initial water repellency |  | 103 | 98 | 105 | 82 | 103 | 106 |
| Initial oil repellency |  | 48 | 50 | 47 | 26 | 48 | 52 |
| Long-term water repellency |  | 85 | 83 | 86 | 64 | 6 | 78 |
| Long-term Stain removability |  | ◯ | ◯ | ◯ | X | XX | XX |

In Table 14, the B'/A molar ratio is as described below, and the other items have the same meanings as in Table 1 and Table 7. Incidentally, the application steps were carried out by 3C2B.

1) B'/A molar ratio: Moles of the epoxy group in the component (B') per mole of the epoxy group in the component (A).

COMPARATIVE EXAMPLE 35

The same procedure as in Example 36 was repeated, except that the coating having the formulation shown in Table 14 used as the second clear coating in Example 36 was replaced by the same carboxyl-epoxy type clear coating as used in Comparative Example 7. The performance test results obtained are shown in Table 15.

COMPARATIVE EXAMPLE 36

The same procedure as in Example 36 was repeated, except that the coating having the formulation shown in Table 14 used as the second clear coating was replaced by the same hydroxyl group-containing acrylic resin/melamine resin-based clear coating as used in Comparative Example 8. The performance test results obtained are shown in Table 15.

TABLE 15

|  | Comparative Examples | |
|---|---|---|
|  | 35 | 36 |
| Finish appearance | ◯ | ◯ |
| Hardness 20° C. | 10 | 9 |
| 60° C. | 2 | 2 |
| Acid resistance | ◯ | X |
| Resistance to bird droppings | X | X |
| Resistance to pollen | X | X |
| Minimum modulus | $1.2 \times 10^8$ | $4.0 \times 10^9$ |
| Initial water repellency | 83 | 80 |

TABLE 15-continued

|  | Comparative Examples | |
|---|---|---|
|  | 35 | 36 |
| Initial oil repellency | 35 | 32 |
| Long-term water repellency | 59 | 62 |
| Long-term Stain removability | XX | XX |

EXAMPLES 39 TO 43

Coating compositions were prepared by mixing the components (A), (B") and (C) prepared in the above Preparation of Samples. The proportions of these components used are shown in Table 16.

EXAMPLE 44

The present Example is a specific example employing 2C1B. To a material to be coated obtained by applying to a metal panel a cationic electrocoating and an intermediate coating and heat-curing them was applied an acrylic resin/melamine resin-based organic solvent type metallic coating (cured film thickness: 20 μm); thereafter, to the uncured film of the metallic coating was applied the coating composition (clear coating) obtained in Example 39 (cured film thickness: 40 μm); then the resulting material was heated at 140° C. for 30 minutes to cure both the above coatings: and the resulting panel was subjected to the same performance tests as shown in Table 1. The results obtained are shown in Table 16.

EXAMPLE 45

The same procedure as in Example 39 was repeated, except that the 3C2B used in Example 39 was changed to 3-coat 1-bake. The performance test results obtained are shown in Table 16.

EXAMPLE 46

The same procedure as in Example 39 was repeated, except that the 0.5 part of the component (C-1) used in Example 39 was replaced by 0.5 part of the component (C-2). The performance test results obtained are shown in Table 16.

TABLE 16

|  | Examples | | | | | | | |
|---|---|---|---|---|---|---|---|---|
|  | 39 | 40 | 41 | 42 | 43 | 44 | 45 | 46 |
| (A-1) | 70 |  | 50 | 35 | 75 | 70 | 70 | 70 |
| (A-2) |  | 60 |  |  |  |  |  |  |
| (B"-1) | 30 | 40 |  |  |  | 30 | 30 | 30 |
| (B"-2) |  |  | 50 |  |  |  |  |  |
| (B"-3) |  |  |  | 65 | 25 |  |  |  |
| (C-1) | 0.5 | 1 | 0.5 | 0.5 | 0.5 | 0.5 | 0.5 |  |
| (C-2) |  |  |  |  |  |  |  | 0.5 |
| Average epoxy equivalent | 145 | 222 | 171 | 189 | 148 | 145 | 145 | 145 |
| B"/A molar ratio | 0.28 | 0.80 | 0.52 | 0.97 | 0.17 | 0.28 | 0.28 | 0.28 |
| Modaflow | 0.2 | 0.2 | 0.2 | 0.2 | 0.2 | 0.2 | 0.2 | 0.2 |
| Application steps | 3C2B | 3C2B | 3C2B | 3C2B | 3C2B | 2C1B | 3C1B | 3C2B |
| Finish appearance | ○ | ○ | ○ | ○ | ○ | ○ | ○ | ○ |
| Hardness 20° C. | 21 | 18 | 19 | 17 | 22 | 19 | 20 | 22 |
| 60° C. | 13 | 11 | 13 | 11 | 14 | 11 | 12 | 13 |
| Acid resistance | ○ | ○ | ○ | ○ | ○ | ○ | ○ | ○ |
| Stain removability | ○ | ○ | ○ | ○ | ○ | ○ | ○ | ○ |
| Resistance to bird droppings | ○ | ○ | ○ | ○ | ○ | ○ | ○ | ○ |
| Resistance to pollen | ○ | ○ | ○ | ○ | ○ | ○ | ○ | ○ |
| Minimum modulus | $3.2 \times 10^9$ | $2.0 \times 10^9$ | $2.5 \times 10^9$ | $3.0 \times 10^9$ | $3.4 \times 10^9$ | $3.2 \times 10^9$ | $3.2 \times 10^9$ | $3.2 \times 10^9$ |

In Table 16, the average epoxy equivalent and the B"/A molar ratio are as described below, and the other items have the same meanings as in Table 1.

1) Average epoxy equivalent: The average epoxy equivalent of the total of the epoxy groups in the component (A) and the epoxy groups and oxetane functional groups in the component (B").

2) B"/A molar ratio: Moles of the total of the epoxy groups and oxetane functional groups in the component (B") per mole of the epoxy groups in the component (A).

COMPARATIVE EXAMPLES 37 to 41

Coating compositions were prepared using the components for Comparative Examples and components for Examples, prepared in the above Preparation of Samples. The proportions of these components used are shown in Table 17. The proportions of the components used, the average epoxy equivalent, the B"/A molar ratio, the 3C2B and the like in Table 17 have the same meanings as in Table 16. Moreover, the test methods, evaluation criteria and judgement are the same as in Table 16.

TABLE 17

|  | Comparative Examples | | | | |
|---|---|---|---|---|---|
|  | 37 | 38 | 39 | 40 | 41 |
| (A-1) | 50 | 60 | 30 |  |  |
| (A-3) |  |  |  | 70 |  |
| (A-4) |  |  |  |  | 40 |
| (B"-1) | 50 |  |  | 30 | 60 |
| (B"-4) |  | 40 | 70 |  |  |

TABLE 17-continued

|  | Comparative Examples | | | | |
|---|---|---|---|---|---|
|  | 37 | 38 | 39 | 40 | 41 |
| (C-1) | 0.5 | 0.5 | 0.5 | 0.5 | 0.5 |
| (C-2) |  |  |  |  |  |
| Average epoxy equivalent | 157 | 267 | 372 | 162 | 137 |
| B"/A molar ratio | 0.68 | 0.18 | 0.63 | 0.32 | 0.7 |
| Modaflow | 0.2 | 0.2 | 0.2 | 0.2 | 0.2 |
| Application steps | 3C2B | 3C2B | 3C2B | 3C2B | 3C2B |
| Finish appearance | ○ | ○ | ○ | ○ | ○ |
| Hardness 20° C. | 9 | 17 | 10 | 7 | 13 |
| 60° C. | 2 | 4 | 2 | 2 | 3 |
| Acid resistance | X | Δ | Δ | Δ | ○ |
| Stain removability | X | Δ | Δ | X | Δ |
| Resistance to bird droppings | X | X | X | X | X |
| Resistance to pollen | Δ | Δ | X | X | X |

COMPARATIVE EXAMPLE 42

The same procedure as in Example 39 was repeated, except that the second clear coating used in Example 39 was replaced by the same carboxyl-epoxy type clear coating as used in Comparative Example 7. The performance test results obtained are shown in Table 18.

COMPARATIVE EXAMPLE 43

The same procedure as in Example 39 was repeated, except that the second clear coating used in Example 39 was replaced by the same hydroxyl group-containing acrylic resin/melamine resin-based clear coating as in Comparative Example 8. The performance test results obtained are shown in Table 18.

TABLE 18

|  | Comparative Examples | |
| --- | --- | --- |
|  | 42 | 43 |
| Application steps | 3C2B | 3C2B |
| Finish appearance | ◯ | ◯ |
| Hardness 20° C. | 10 | 9 |
| 60° C. | 2 | 2 |
| Acid resistance | ◯ | X |
| Stain removability | Δ | X |
| Resistance to brid droppings | X | X |
| Resistance to pollen | X | X |

What is claimed is:

1. A thermosetting organic solvent coating composition capable of forming a cured coating film having a TUKON hardness at 20° C. of 15 or more when a coating of the composition is applied on a glass plate so as to give a film having a thickness of 30 μm as cured, and the resulting film is heat-cured at 140° C. for 30 minutes; and a minimum value of dynamic modulus E' at a frequency of 110 Hz in the temperature range of 150–200° C., of $1 \times 10^9$ dyn/cm$^2$ or more, which comprises:
   (A) a compound containing at least 2 alicyclic epoxy groups in the molecule and having a number-average molecular weight of smaller than 2,000,
   (B) an epoxy group-containing acrylic resin having a number-average molecular weight of 2,000–50,000, a hydroxyl value of 10–150 mg KOH/g and an epoxy equivalent of 220 or less,
   (C) a thermoinitiated cationic polymerization catalyst, and
   (D) a fluorine-containing resin,
   wherein the molar ratio of the epoxy groups of the component (A) to the epoxy groups of the component (B) is 1:1 to 1:0.05.

2. A thermosetting organic solvent coating composition capable of forming a cured coating film having a TUKON hardness at 20° C. of 15 or more when a coating of the composition is applied on a glass plate so as to give a film having a thickness of 30 μm as cured, and the resulting film is heat-cured at 140° C. for 30 minutes; and a minimum value of dynamic modulus E' at a frequency of 110 Hz in the temperature range of 150–200° C., of $1 \times 10^9$ dyn/cm$^2$ or more, which comprises:
   (A) a compound containing at least 2 alicyclic epoxy groups in the molecule and having a number-average molecular weight of smaller than 2,000,
   (B) an epoxy group-containing acrylic resin having a number-average molecular weight of 2,000–50,000, a hydroxyl value of 10–150 mg KOH/g and an epoxy equivalent of 220 or less,
   (C) a thermoinitiated cationic polymerization catalyst, and
   (F) a hydrolyzable alkoxysilyl group-containing compound selected from the group consisting of
      (F-1) a condensate of tetramethyl silicate and/or tetraethyl silicate, having a low condensation degree of 2–10,
      (F-2) a partial hydrolysis condensate of a silane mixture of 100 parts by weight of an alkoxysilane compound containing at least one organic functional group selected from the group consisting of mercapto group, epoxy group, (meth)acryloyl group and vinyl group and 20–2,000 parts by weight of a tetraalkoxysilane compound, and
      (F-3) an organic functional group- and hydrolyzable group-containing silicone compound having an average polymerization degree of 3–100, obtained by cocondensing under hydrolysis conditions:
         5–80 mole % in total, of (1) a compound represented by the following general formula:

$$R^1R^2Si(Z)_2$$

wherein $R^1$ is an organic functional group selected from epoxy group, mercapto group, (meth)acryloyl group and vinyl group; $R^2$ is a $C_{1-3}$ alkyl group; and Z is a hydrolyzable group, and/or a compound represented by the following general formula:

$$R^1Si(Z)_3$$

wherein $R^1$ and Z have the same definitions as given above,
         0.1–30 mole % of (2) a compound represented by the following general formula:

$$R^2Si(Z)_3$$

wherein $R^2$ and Z have the same definitions as given above, and
         10–94.9 mole % of (3) a compound represented by the following general formula:

$$Si(Z)_4$$

wherein Z has the same definition as given above,
            the total amount of the compound (2) and the compound (3) being 20–95 mole %,
   wherein the molar ratio of the epoxy groups of the component (A) to the epoxy groups of the component (B) is 1:1 to 1:0.05.

3. A thermosetting organic solvent coating composition capable of forming a cured coating film having a TUKON hardness at 20° C. of 15 or more when a coating of the composition is applied on a glass plate so as to give a film having a thickness of 30 μm as cured, and the resulting film is heat-cured at 140° C. for 30 minutes; and a minimum value of dynamic modulus E' at a frequency of 110 Hz in the temperature range of 150–200° C., of $1 \times 10^9$ dyn/cm$^2$ or more, which comprises:
   (A) a compound containing at least 2 alicyclic epoxy groups in the molecule and having a number-average molecular weight of smaller than 2,000,
   (B) an epoxy group-containing acrylic resin having a number-average molecular weight of 2,000–50,000, a hydroxyl value of 10–150 mg KOH/g and an epoxy equivalent of 220 or less, and
   (C) a thermoinitiated cationic polymerization catalyst,
   wherein the molar ratio of the epoxy groups of the component (A) to the epoxy groups of the component (B) is 1:1 to 1:0.05, the component (B) being an acrylic resin containing not only epoxy group but also dialkylsiloxy group.

4. A thermosetting organic solvent coating composition capable of forming a cured coating film having a TUKON hardness at 20° C. of 15 or more when a coating of the composition is applied on a glass plate so as to give a film having a thickness of 30 μm as cured, and the resulting film is heat-cured at 140° C. for 30 minutes; and a minimum value of dynamic modulus E' at a frequency of 110 Hz in the temperature range of 150–200° C., of $1 \times 10^9$ dyn/cm$^2$ or more, which comprises:

(A) a compound containing at least 2 alicyclic epoxy groups in the molecule and having a number-average molecular weight of smaller than 2,000, (B) an epoxy group-containing acrylic resin having a number-average molecular weight of 2,000–50,000, a hydroxyl value of 10–150 mg KOH/g and an epoxy equivalent of 220 or less, and (C) a thermoinitiated cationic polymerization catalyst, wherein the molar ratio of the epoxy groups of the component (A) to the epoxy groups of the component (B) is 1:1 to 1:0.05, and the component (B) is an acrylic resin containing not only epoxy group but also oxetane functional group represented by the following formula:

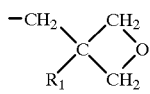

wherein $R_1$ is a hydrogen atom, a fluorine atom, a $C_{1-6}$ alkyl group, a $C_{1-6}$ fluoroalkyl group, an allyl group, an aryl group, an aralkyl group, a furyl group or a thienyl group.

5. A coating composition according to one of claims 1–4, wherein the TUKON hardness at 20° C. is 17–25 and the minimum value of dynamic modulus E' at a frequency of 110 Hz in the temperature range of 150–200° C. is in the range of $1.1 \times 10^9$ to $8 \times 10^9$ dyn/cm$^2$.

6. A coating composition according to one of claims 1–4, wherein the component (A) is a compound containing 2 or 3 alicyclic epoxy groups in the molecule and having a number-average molecular weight of 100–1,500.

7. A coating composition according to one of claims 1–4, wherein the component (A) is selected form the group consisting of dicyclopentadiene dioxide, bis(2,3-epoxycyclopentyl) ether, ethylene glycol bis(epoxycyclohexenecarboxylate), bis(3,4-epoxycyclohexylmethyl) adipate, bis(4,5-epoxy-2-methylcyclohexylmethyl) adipate, ethylene glycol bis(3,4-epoxycyclohexanecarboxylate), 3',4'-epoxycyclohexylmethyl-3,4-epoxycyclohexanecarboxylate, 3,4-epoxy-6-methylcyclohexylmethyl-3,4-epoxy-6-methylcyclohexanecarboxylate, 1,2,5,6-diepoxy-4,7-methanoper-hydroindene, 2-(3,4-epoxycyclohexyl)-3',4'-epoxy-1,3-dioxane-5-spiro-cyclohexane, 1,2-ethylenedioxy-bis(3,4-epoxycyclohexylmethane), di-2,3-epoxycyclopentyl ether and 4',5'-epoxy-2'-methylcyclohexylmethyl 4,5-epoxy-2-methylcyclohexane-carboxylate.

8. A coating composition according to one of claims 1–4, wherein the epoxy groups of the component (B) are alicyclic epoxy groups or glycidyl (meth)acrylate-derived epoxy groups.

9. A coating composition according to one of claims 1–4, wherein the component (B) is obtained by copolymerizing an epoxy group-containing polymerizable monomer, a hydroxyl group-containing polymerizable monomer, a polymerizable acrylic monomer and, as necessary, other polymerizable monomer.

10. A coating composition according to one of claims 1–4, wherein the component (B) is an epoxy group-containing acrylic resin having a number-average molecular weight of 3,000–20,000, a hydroxyl value of 20–120 mg KOH/g and an epoxy equivalent of 100–220.

11. A coating composition according to one of claims 1–4, wherein the average epoxy equivalent of the component (A) and the component (B) is 300 or less.

12. A coating composition according to one of claims 1–4, wherein the molar ratio of the epoxy groups of the component (A) to the epoxy groups of the component (B) is 1:0.8 to 1:0.2.

13. A coating composition according to one of claims 1–4, wherein the component (C) is a compound which is inactive at room temperatures but, when heated to reach a critical temperature of about 100–180° C., causes cleavage to generate a cation and give rise to cationic polymerization.

14. A coating composition according to one of claims 1–4, wherein the component (C) is an onium salt of nitrogen, sulfur, phosphorus or iodine whose negative ion component is one member selected from the group consisting of $SbF_6^-$, $SbF_4^-$, $AsF_6^-$ and $PF_6^-$.

15. A coating composition according to one of claims 1–4, which comprises the component (C) in an amount of 0.05–10 parts by weight per 100 parts by weight of the total solid content of the component (A) and the component (B).

16. A coating composition according to one of claims 1–4, which is capable of forming a clear coating film.

17. A coating composition according to claim 1, wherein the component (D) is in the form of:

(D-1) a non-aqueous polymer dispersion which is a dispersion of particles of a polymer containing fluoroalkyl group-containing (meth)acrylate units, in an organic solvent solution containing a dispersion stabilizer resin, the particles being insoluble in said organic solvent, (D-2) a non-aqueous polymer dispersion which is a dispersion of polymer particles in an organic solvent solution containing a dispersion stabilizer resin consisting of a fluorine-containing resin, the particles being insoluble in said organic solvent, or (D-3) an organic solvent solution of a fluorine-containing resin.

18. A coating composition according to claim 17, wherein the non-aqueous polymer dispersion (D-1) is produced by copolymerizing, in a mixture of a dispersion stabilizer resin and an organic solvent, a fluoroalkyl group-containing (meth)acrylate represented by the following formula:

(wherein R is a hydrogen atom or a methyl group; n is an integer of 1–10; and Rf is a $C_{1-21}$ straight chain or branched chain fluoroalkyl group) with other polymerizable monomer to form insoluble polymer particles in said mixture.

19. A coating composition according to claim 17, wherein the fluorine-containing resin is a (co)polymer of at least one fluorine-containing polymerizable monomer selected from the group consisting of fluoroalkyl group-containing (meth) acrylates and fluoroolefins, or a copolymer of said fluorine-containing polymerizable monomer and other polymerizable monomer.

20. A coating composition according to claim 1, which comprises the component (D) in an amount of 0.5–40 parts by weight per 100 parts by weight of the total solid content of the component (A) and the component (B).

21. A coating composition according to claim 2, which comprises the component (F-1) in an amount of 0.1–50 parts by weight per 100 parts by weight of the total solid content of the component (A) and the component (B).

22. A coating composition according to claim 2, wherein the component (F-2) is a partial hydrolysis condensate of a mixture of a mercapto group-containing alkoxysilane or an epoxy group-containing alkoxysilane with tetramethoxysilane or tetraethoxysilane.

23. A coating composition according to claim 2, which comprises the component (F-2) in an amount of 0.1–50 parts by weight per 100 parts by weight of the total solid content of the component (A) and the component (B).

24. A coating composition according to claim 2, wherein the component (F-3) is a hydrolysis cocondensate of:
   10–50 mole % of the compound (1),
   1–25 mole % of the compound (2), and
   25–90 mole % of the compound (3),
   the total amount of the compound (2) and the compound (3) being 30–80 mole %.

25. A coating composition according to claim 2, which comprises the component (F-3) in an amount of 0.1–50 parts by weight per 100 parts by weight of the total solid content of the component (A) and the component (B).

26. A coating composition according to claim 3, wherein the dialkylsiloxy group is a group represented by the following formula:

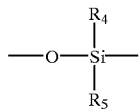

wherein $R_4$ and $R_5$ may be the same or different and are each $C_{1-5}$ alkyl group.

27. A coating according to claim 26, wherein $R_4$ and $R_5$ are the same or different and are each methyl or ethyl.

28. A coating composition according to claim 3, wherein the component (B') is obtained by copolymerizing an epoxy group-containing polymerizable monomer, a hydroxyl group-containing polymerizable monomer, a dialkylsiloxy group-containing polymerizable monomer, a polymerizable acrylic monomer and, as necessary, other polymerizable monomer.

29. A coating composition according to claim 28, wherein the dialkylsiloxy group-containing polymerizable monomer is represented by the following formula:

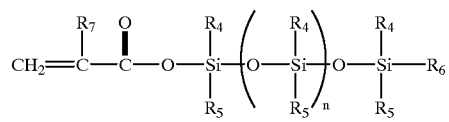

wherein $R_4$, $R_5$ and $R_6$ may be the same or different and are each a $C_{1-5}$ alkyl group; $R_7$ is a hydrogen atom or a methyl group; and n is a value which allows the monomer to have a number average molecular weight of 1,000–20,000.

30. A coating composition according to claim 28, wherein the dialkylsioxy group-containing polymerizable monomer is used in an amount of 0.1–40% by weight of the total amount of the monomers.

31. A coating composition according to claim 4, wherein the acrylic resin has, in the molecule, average 2–10 oxetane groups and average 2–10 epoxy groups.

32. A coating composition according to claim 4, wherein the total functional group equivalent of the oxetane groups and the epoxy groups is 400 or less.

33. A coating composition according to claim 4, wherein the component (B") is obtained by copolymerizing an oxetane functional group-containing polymerizable monomer, an epoxy group-containing polymerizable monomer, a hydroxyl group-containing polymerizable monomer, a polymerizable acrylic monomer and, as necessary, other polymerizable monomer.

34. A coating composition according to claim 4, wherein the molar ratio of the alicyclic epoxy groups in the component (A) and the total of the epoxy groups and oxetane functional groups in the component (B") is 1:1 to 1:0.05.

35. A coating composition according to claim 4, wherein the total functional group equivalent of the alicyclic epoxy groups in the component (A) and the epoxy groups and oxetane functional groups in the component (B") is 300 or less based on the total amount of the component (A) and the component (B").

* * * * *